(12) United States Patent
Cheatham et al.

(10) Patent No.: US 7,036,782 B2
(45) Date of Patent: May 2, 2006

(54) ELECTRICAL BOX MOUNTING BRACKETS

(75) Inventors: James F. Cheatham, Palos Verdes, CA (US); Fred Milne, Huntington Beach, CA (US)

(73) Assignee: Team Manufacturing, Inc., Rancho Dominguez, CA (US)

( * ) Notice: Subject to any disclaimer, the term of this patent is extended or adjusted under 35 U.S.C. 154(b) by 0 days.

(21) Appl. No.: 10/763,926

(22) Filed: Jan. 22, 2004

(65) Prior Publication Data

US 2005/0001123 A1     Jan. 6, 2005

Related U.S. Application Data

(60) Provisional application No. 60/441,737, filed on Jan. 22, 2003, provisional application No. 60/445,026, filed on Feb. 4, 2003.

(51) Int. Cl.
*A47F 5/00*     (2006.01)
(52) U.S. Cl. ................................. 248/298.1; 248/906
(58) Field of Classification Search ............ 248/298.1, 248/300, 906, 200.1
See application file for complete search history.

(56) References Cited

U.S. PATENT DOCUMENTS

| | | | | |
|---|---|---|---|---|
| 1,288,024 A | * | 12/1918 | Kendig | 220/3.9 |
| 3,182,805 A | * | 5/1965 | Foster, Jr. et al. | 211/26 |
| 4,757,967 A | * | 7/1988 | Delmore et al. | 248/218.4 |
| 4,964,525 A | * | 10/1990 | Coffey et al. | 220/3.9 |
| 5,114,105 A | * | 5/1992 | Young | 248/27.1 |
| 5,330,137 A | * | 7/1994 | Oliva | 248/27.1 |
| 5,386,959 A | * | 2/1995 | Laughlin et al. | 248/205.1 |
| 5,516,068 A | * | 5/1996 | Rice | 248/300 |
| 5,931,425 A | * | 8/1999 | Oliva | 248/200.1 |
| 6,209,836 B1 | * | 4/2001 | Swanson | 248/300 |
| 6,666,419 B1 | * | 12/2003 | Vrame | 248/200.1 |
| 6,803,521 B1 | * | 10/2004 | Vrame | 174/58 |

\* cited by examiner

*Primary Examiner*—Anita M. King
(74) *Attorney, Agent, or Firm*—Jon E. Hokanson; Brian F. Drazich

(57) ABSTRACT

Electrical box mounting brackets for use in mounting electrical brackets between structural members in walls, floors or ceilings, such as, for example, between wall studs, ceiling joists or floor joists, and including brackets made of component sections that are fastened together in fixed relationship to each other, as well as brackets made of component parts in which the length sections are made to be in sliding relationship to each other, to provide an adjustable bracket that may be used between structural members separated by predetermined distances, such as 16 inches, 24 inches, or other distances.

5 Claims, 24 Drawing Sheets

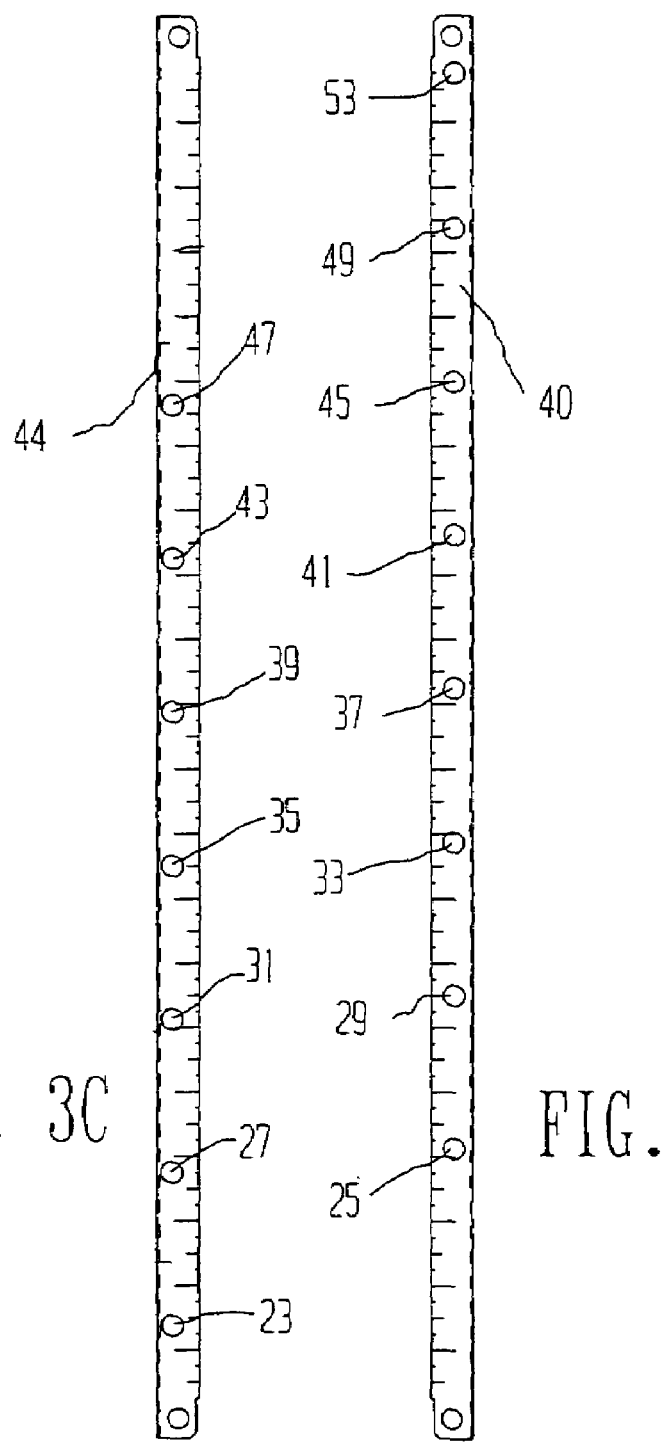
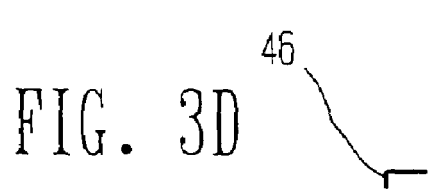
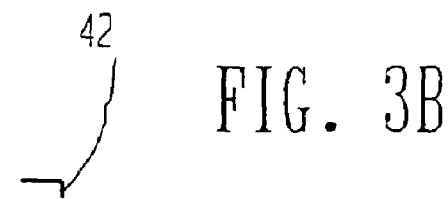
FIG. 3C    FIG. 3A
FIG. 3D    FIG. 3B

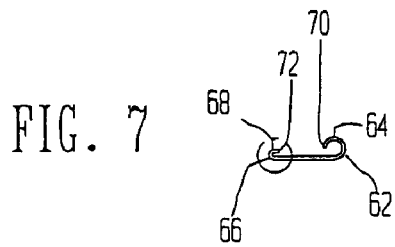
FIG. 7
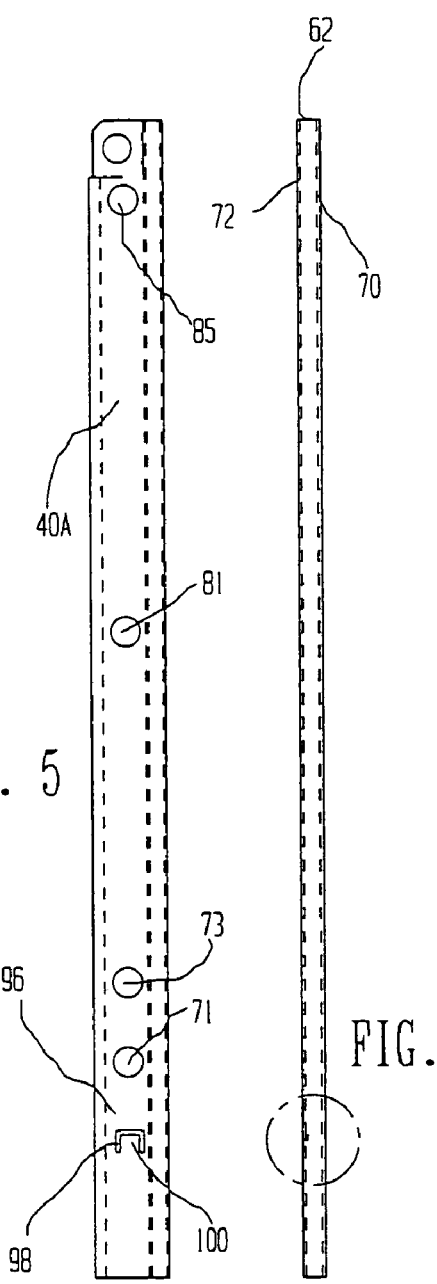
FIG. 5
FIG. 6
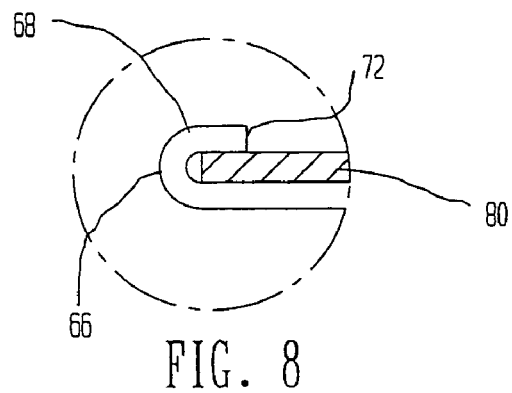
FIG. 8
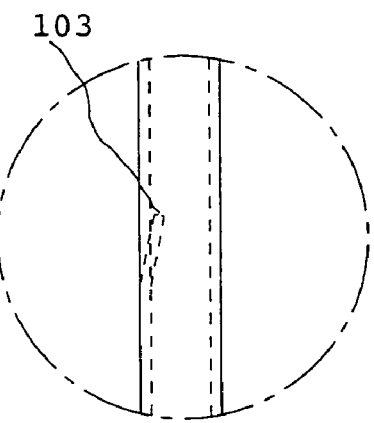
FIG. 9

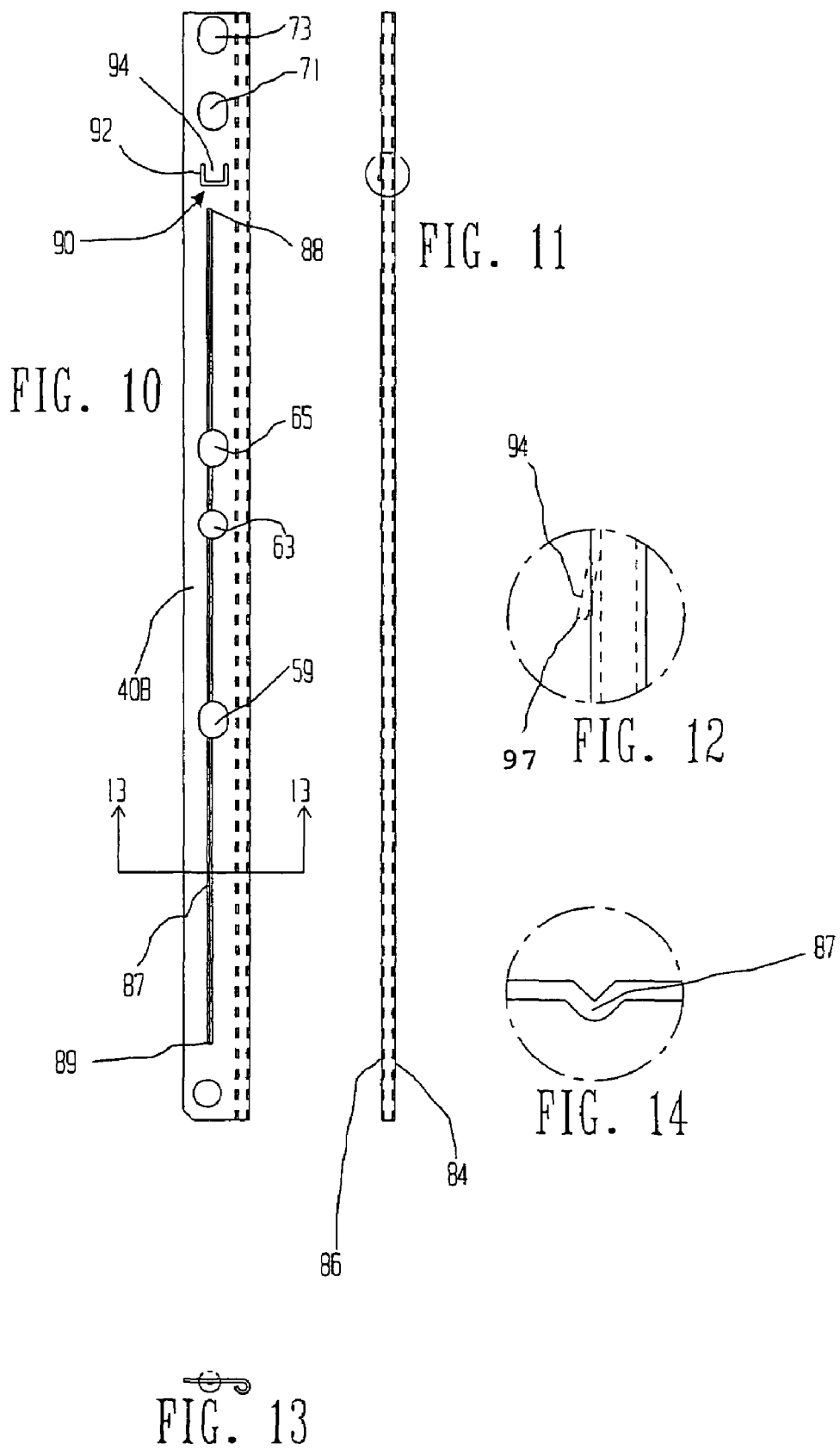

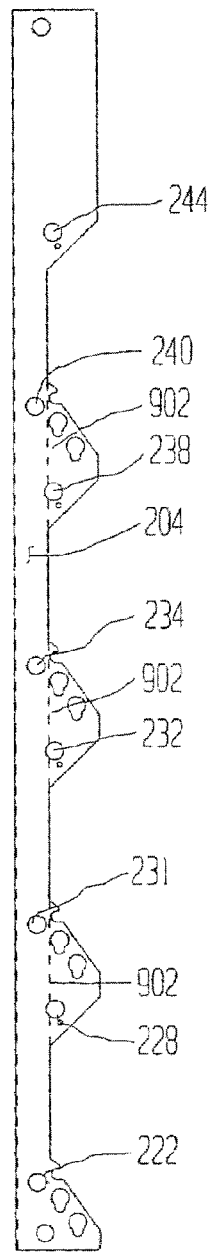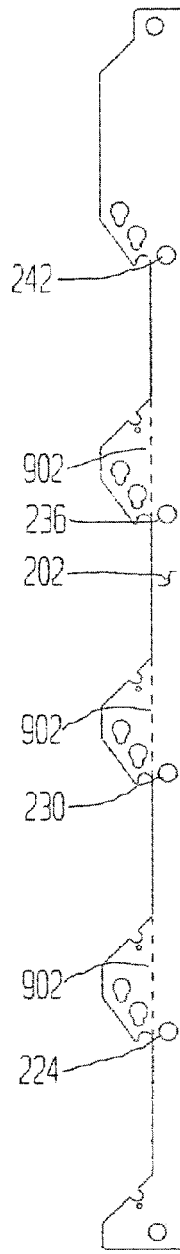
FIG. 25C  FIG. 25A
FIG. 25D  FIG. 25B

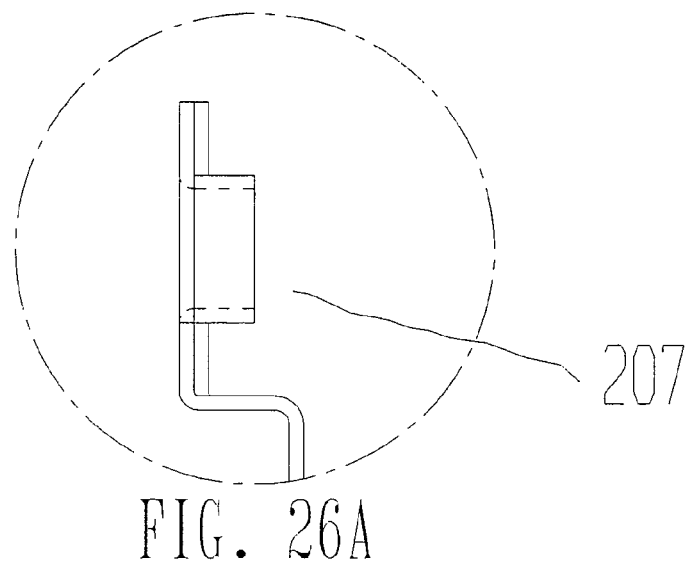
FIG. 26A
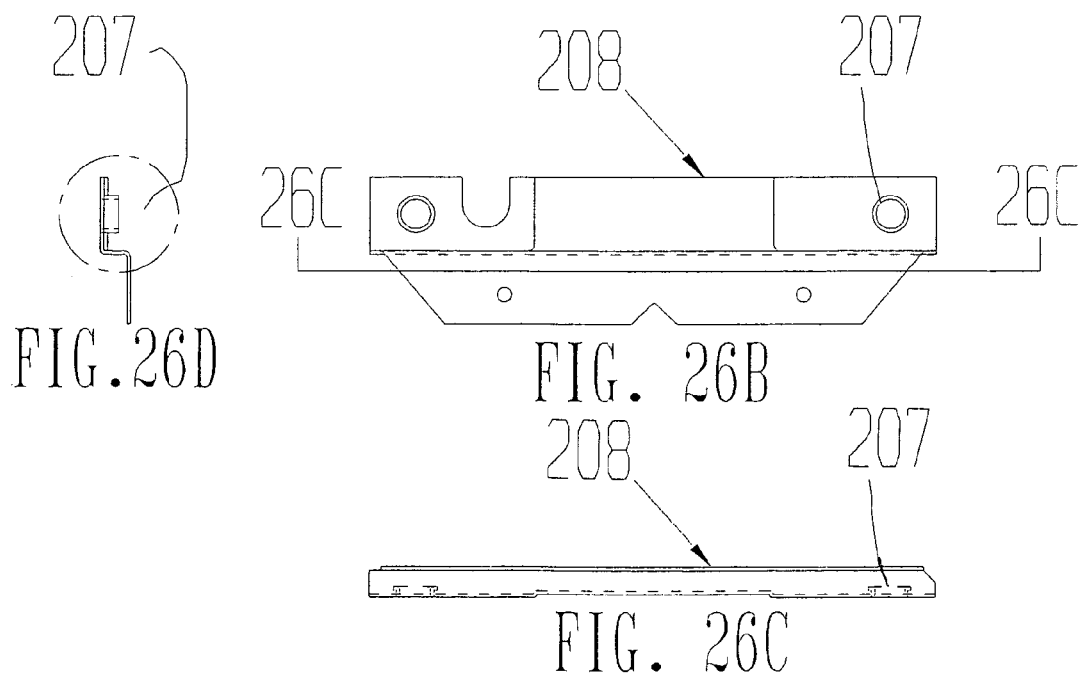
FIG. 26D
FIG. 26B
FIG. 26C

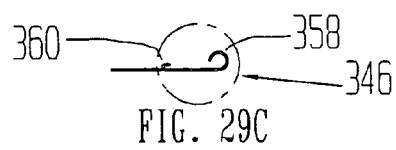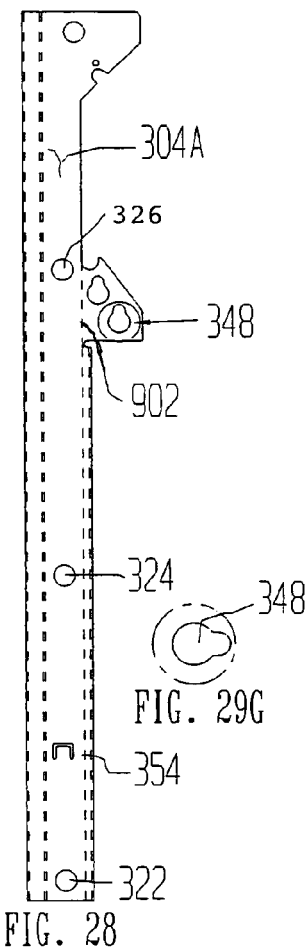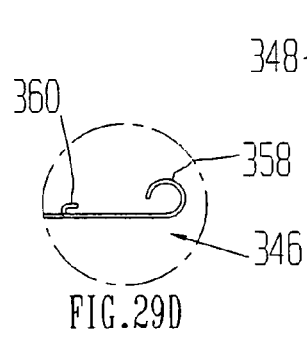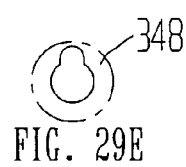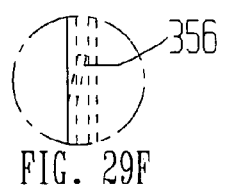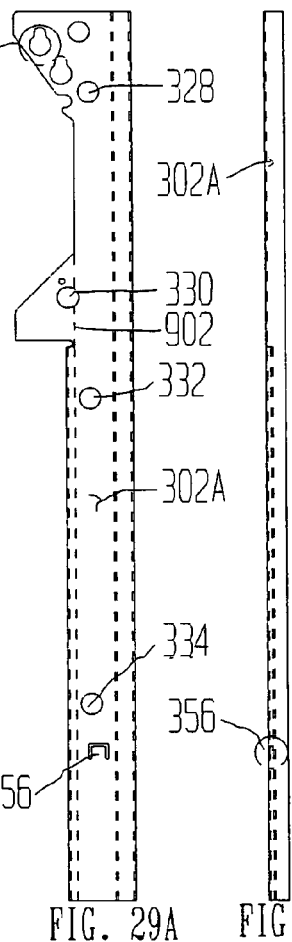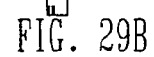

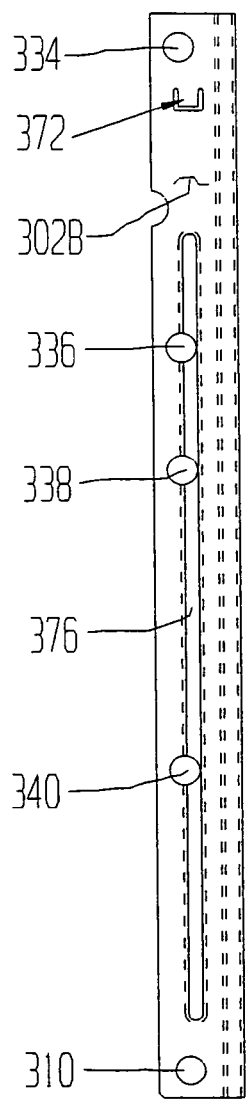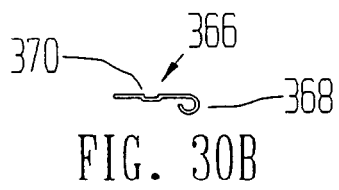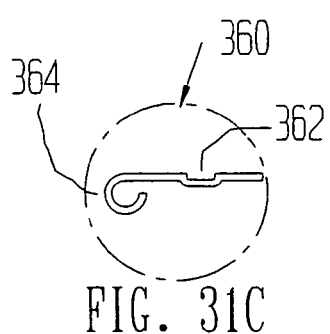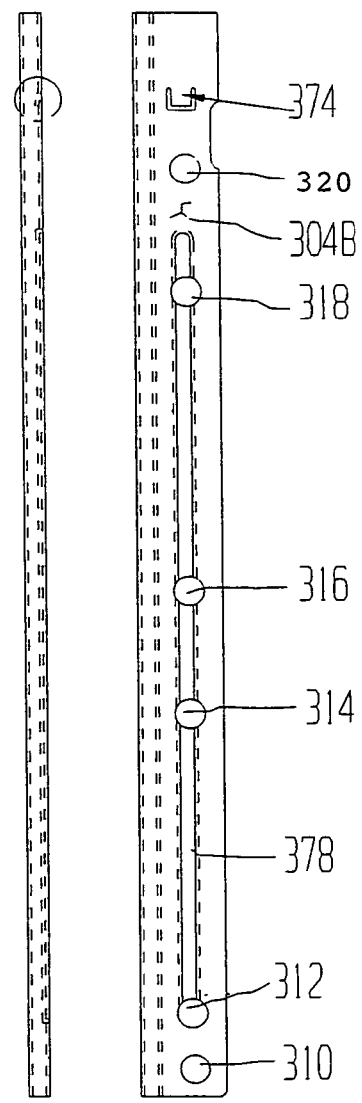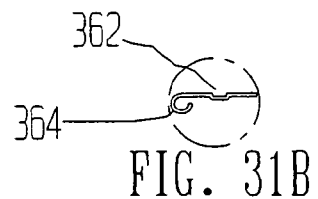
FIG. 30A  FIG. 31C  FIG. 31A
FIG. 30B  FIG. 31B
FIG. 31D

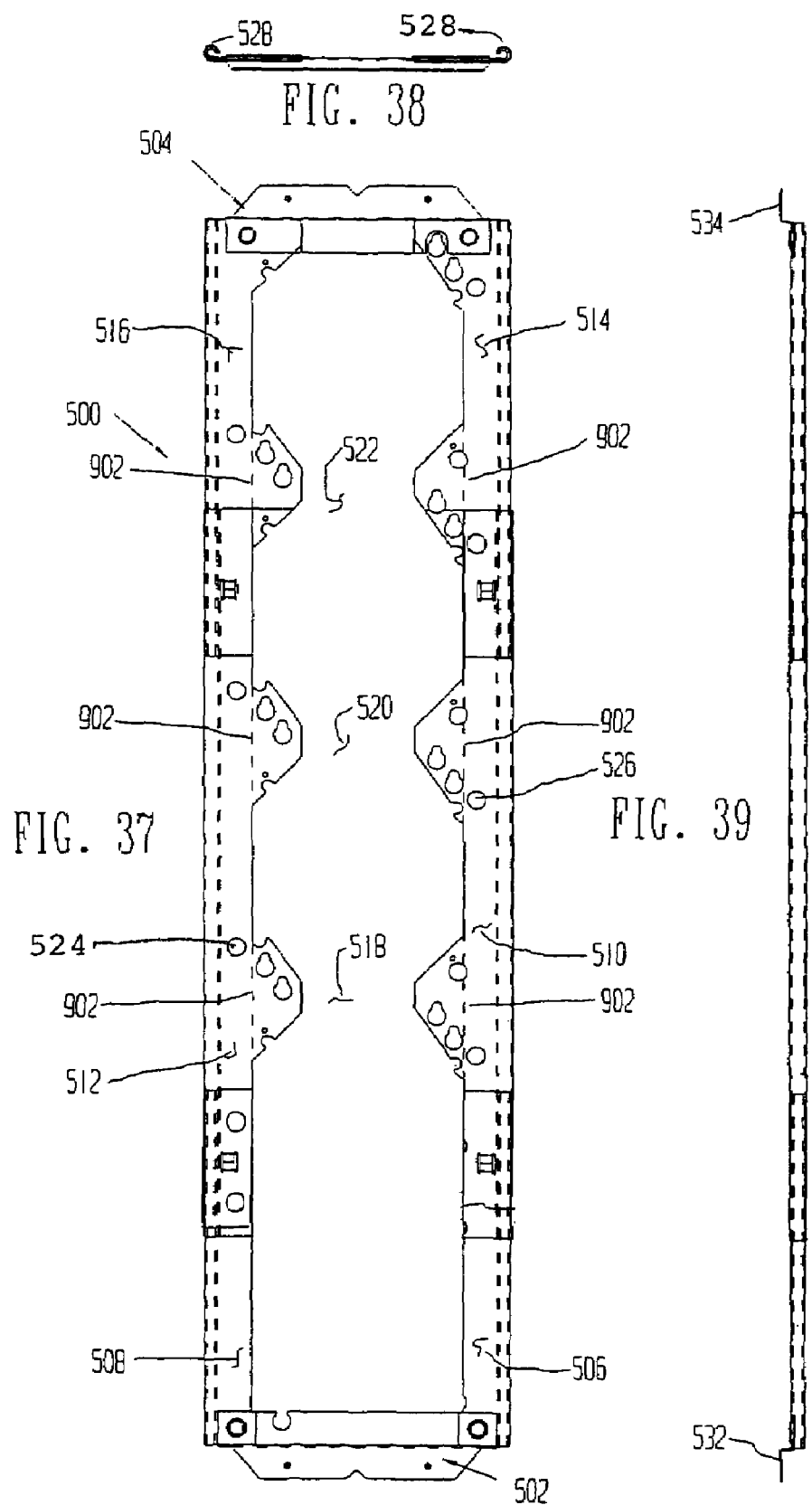

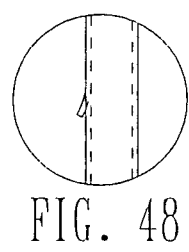
FIG. 47
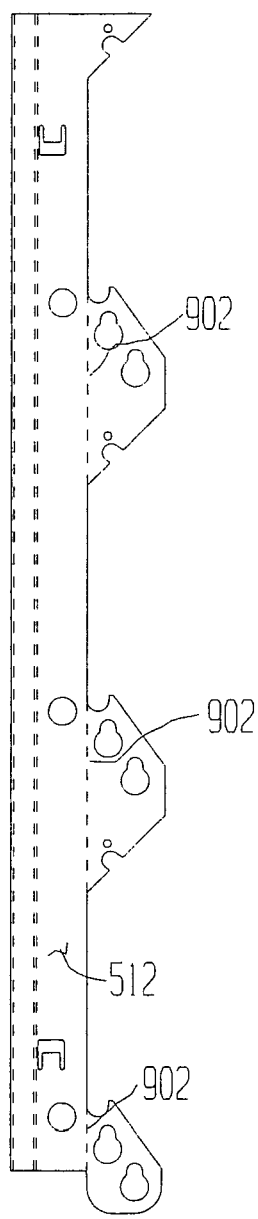
FIG. 45
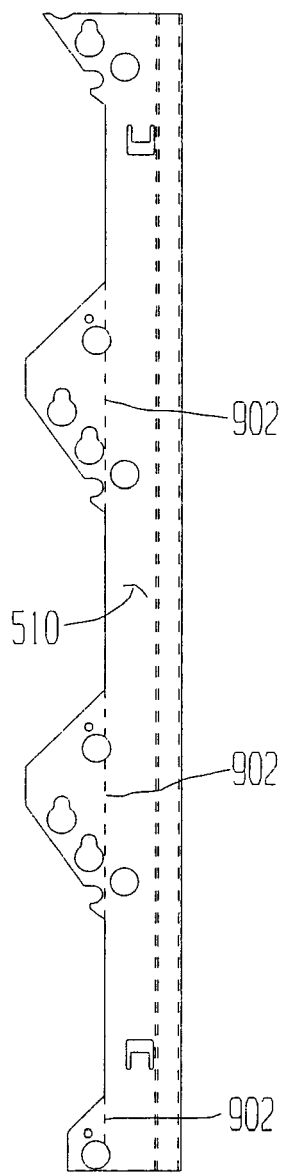
FIG. 46
FIG. 48
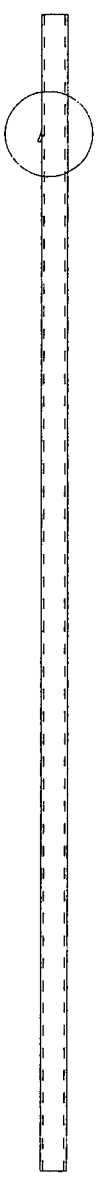
FIG. 49

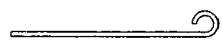
FIG. 52
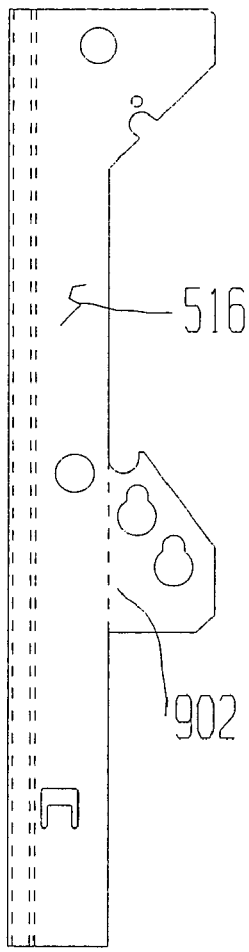
FIG. 50
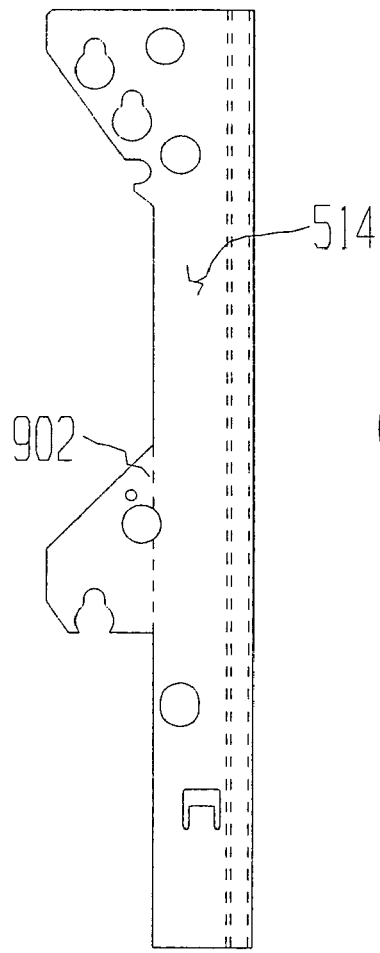
FIG. 51 · FIG. 53
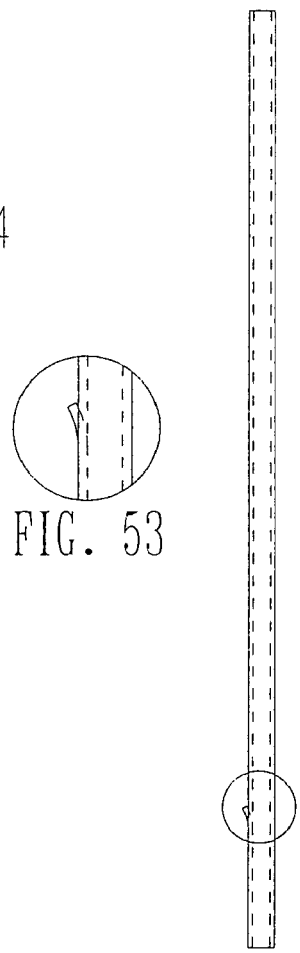
FIG. 54

ELECTRICAL BOX MOUNTING BRACKETS

CROSS REFERENCE TO RELATED APPLICATIONS

This application claims the benefit of U.S. Provisional Application Ser. No. 60/441,737 filed Jan. 22, 2003, and of U.S. Provisional Application Ser. No. 60/445,026 filed Feb. 4, 2003, each of which are incorporated herein by reference.

TECHNICAL FIELD

The present invention is directed to mounting brackets used for mounting or supporting electrical connection boxes.

BACKGROUND ART

Various types of brackets used for mounting or supporting electrical connection boxes are known. For example, U.S. Pat. No. 5,330,137 (the '137 patent) to Oliva describes apparatus and method for mounting an electrical box between studs in a wall. Embodiments of the present invention include improvements to the mounting brackets as described in the '137 patent, which is incorporated by reference herein. The mounting bracket of the '137 patent is of a unitary construction, having an open face, and is of a length of either 16 or 24 inches, to accommodate the distance typically separating wall studs used in the construction industry.

Another type of conventional mounting bracket, or electrical fastener used for supporting electrical connection boxes does not have an open face, but rather has three or four pre-designated slots, or open spaces for mounting three or four electrical boxes at precise, predetermined locations. These mounting brackets are commonly referred to as "box mounting brackets" and are available from numerous sources, such as Raco; Thomas & Betts as its "Steel City" brand electrical fastener; Cooper as its "B-Line" brand electrical fastener; and Caddy, as its model RBS 16 electrical fastener for accommodating three electrical boxes, or its model RBS 24 fastener for accommodating four electrical boxes. These brackets include pairs of holes positioned at predetermined locations for precise positioning of large electrical boxes and/or large electrical box covers. As with the mounting brackets of the '137 patent, the RBS 16 and RBS 24 type brackets are of a unitary construction. Also, single bar brackets, both fixed and adjustable are know, as shown and described in U.S. Pat. No. 4,757,967 and U.S. Pat. No. 5,386,959.

DISCLOSURE OF THE INVENTION

With the objectives of improving conventional mounting brackets, reducing the cost of manufacture of mounting brackets for electrical boxes, and providing novel functionality for mounting brackets for electrical boxes in comparison to conventional mounting brackets, the present invention includes features for mounting brackets for electrical boxes that are manufactured from discreet pieces, and then joined and fabricated into a mounting bracket. In an alternate embodiment, the sides or rails of the bracket are fabricated to have a telescoping or sliding relationship so that the length of the bracket may be adjusted. The result includes significant savings of cost of manufacture of such brackets; adjustability of the length of the mounting brackets so that a single mounting bracket may be used to accommodate any of a conventional 16-inch, a 24-inch distance, or 24-inch distance, such as, for example an 11-inch distance or greater distances such as a 27-inch distance.

BRIEF DESCRIPTION OF THE DRAWINGS

FIG. 3A is a front view of the top frame of the FIG. 1 embodiment.

FIG. 3B is a side view of the top frame of the FIG. 1 embodiment.

FIG. 3C is a front view of the bottom frame of the FIG. 1 embodiment.

FIG. 3D is a side view of the bottom frame of the FIG. 1 embodiment.

FIG. 5 is a front view of the top left frame of the FIG. 2 embodiment.

FIG. 6 is a top view of the top left frame of the FIG. 2 embodiment.

FIG. 7 is a side view of the FIG. 5 frame.

FIG. 8 is an enlarged detail as indicated in FIG. 7.

FIG. 9 is an enlarged detail of the region as indicated in FIG. 6.

FIG. 10 is a front view of the top right frame of the second embodiment.

FIG. 11 is a side view of the FIG. 10 frame.

FIG. 12 is an enlarged detail as indicated in FIG. 11.

FIG. 13 is a cross-sectional view of the stiffener of the FIG. 10 frame, taken along line 13—13.

FIG. 14 is an enlarged detail of the stiffener of FIG. 13.

FIG. 25A is a front view of one of the side rails of the FIG. 23 bracket.

FIG. 25B is an end view of the FIG. 25 side rail.

FIG. 25C is a front view of the left side rail of the FIG. 23 bracket.

FIG. 25D is an end view of the FIG. 25C side rail.

FIG. 26A is an enlarged detail of one of the corner connections of the FIG. 23 bracket.

FIG. 26B is a front view of the lower end plate or crosstie of the FIG. 23 bracket.

FIG. 26C is a cross sectional view of the FIG. 26B end plate or crosstie taken through line 26C—26C of FIG. 26B.

FIG. 26D is a side view of a detail of the left side rail to the bottom end plate or crosstie of the FIG. 23 bracket.

FIG. 28 is a front view of the upper left side rail of the FIG. 27 bracket.

FIG. 29A is a front view of the upper right side rail of the bracket as shown in FIG. 27.

FIG. 29B is a side view of the FIG. 29A side rail.

FIG. 29C is an end view of the FIG. 29A side rail.

FIG. 29D is an enlarged detail of FIG. 29C.

FIG. 29E is a view of the screw retaining hole and adjustment slot feature of the present invention in a horizontal orientation.

FIG. 29F is an enlarged detail of FIG. 29B.

FIG. 29G is a view of the screw retaining hole and adjustment slot feature of the present invention in a vertical orientation.

FIG. 30A is the lower left side-rail of the bracket as shown in FIG. 27.

FIG. 30B is an end view of the FIG. 30A side rail.

FIG. 31A is the lower right side rail of the bracket as illustrated in FIG. 27.

FIG. 31B is an end view of the FIG. 31A side rail.

FIG. 31C is an enlarged view of the FIG. 31B end view.

FIG. 31D is a side view of the FIG. 31A side rail.

FIG. 37 is a front view of a caddy-type bracket incorporating various features of the present invention.

FIG. 38 is an end view of the FIG. 37 bracket.

FIG. 39 is a side view of the FIG. 37 bracket.

FIG. 45 is a front view of the left center rail of the FIG. 37 bracket.

FIG. 46 is a front view of the right center rail of the FIG. 37 bracket.

FIG. 47 is an end view of the FIG. 46 center rail.

FIG. 48 is an enlargement of a detail as illustrated in FIG. 49.

FIG. 49 is a side view of the FIG. 46 center rail.

FIG. 50 is a front view of the top left side rail of the bracket of FIG. 37.

FIG. 51 is a front view of the top right side rail of the FIG. 37 bracket.

FIG. 52 is an end view of the FIG. 51 side rail.

FIG. 53 is an enlargement of a detail illustrated in FIG. 54.

FIG. 54 is a side view of the FIG. 51 side rail.

BEST MODE FOR CARRYING OUT THE INVENTION

Oliva Type Assembly Mounting Bracket

Referring to FIGS. 1–3D, a first embodiment of the present invention will be described and referred to on the Oliva type assembly mounting bracket. In general, the present invention is directed to improved brackets for use in mounting electrical boxes to structural members in walls, floors and ceiling, such as studs in walls of buildings or joists in floors or ceilings. The embodiment of FIGS. 1–3D is directed to a bracket that is made from component parts that are assembled into a finished, or completed mounting bracket, in contrast to a conventional mounting bracket which is unitary. As is well known, the conventional, Oliva type bracket is manufactured from a single piece of material, such as metal and as described in the '137 patent. The mounting bracket of FIGS. 1–3D includes novel features that provide additional functionality and that are significant improvements over the mounting brackets described in the '137 patent.

Figure 1:
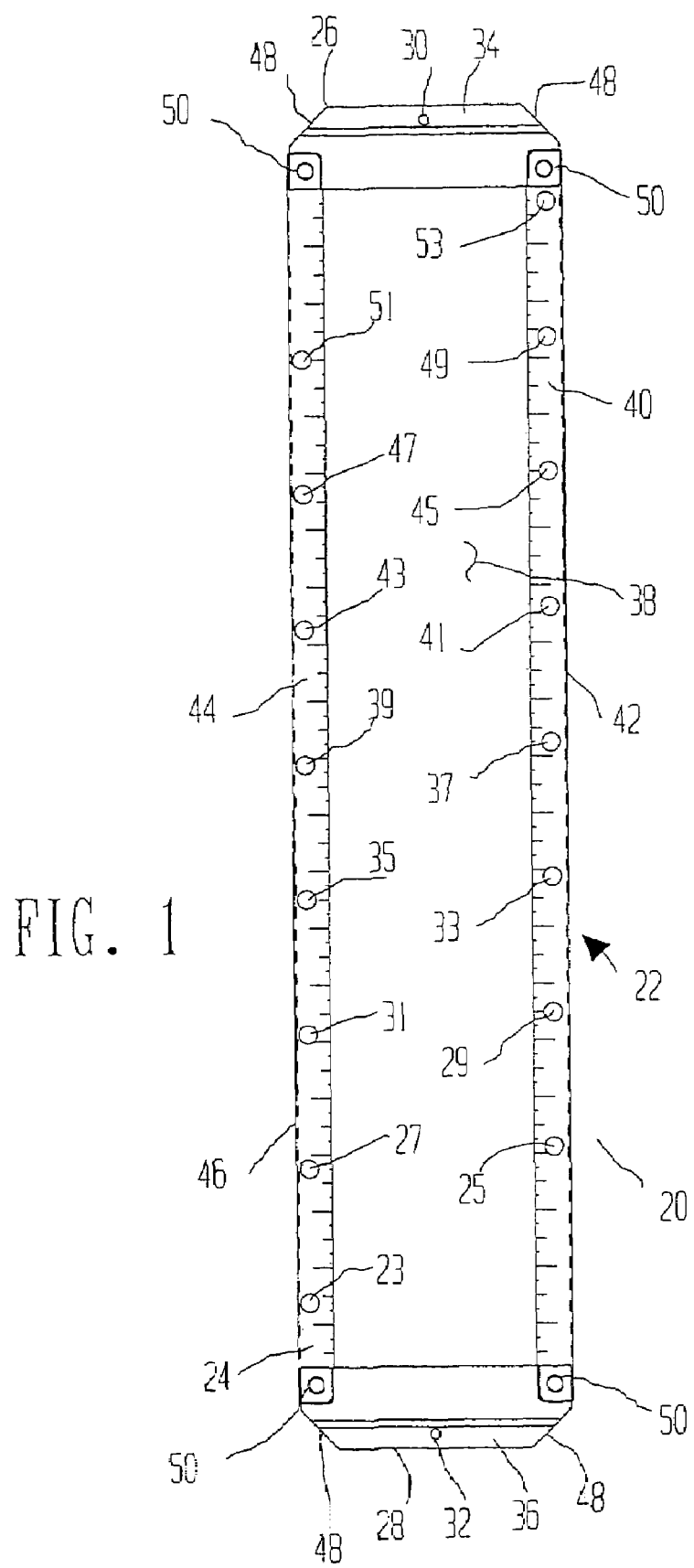
FIG. 1 is a front view of a first embodiment of the present invention bracket.

Referring to FIG. 1, the bracket 20 is of a substantially flat and elongated frame 22. Frame 22 is constructed of relatively rigid material, preferably of a metal such as 20 gauge galvanized sheet metal. Also, other materials may be used, including extruded materials such as plastics or extruded metals, for example aluminum; die-cast materials, for example zinc or aluminum; stamped materials, for example aluminum or certain plastics; injection molded materials, for example plastics; and composite materials, all of which are presently known in this field. The bracket includes a front planar face 24. The bracket also includes a first end plate or crosstie 26, and a second, opposing end plate or crosstie 28, with each end plate or crosstie having a hole 30, 32 for attaching the frame 22 to a corresponding wall stud. At each end plate or crosstie, surface 34, 36 is elevated above the front face 24 of the frame for the reasons described in the '137 patent.

Also, the bracket 20 of the present invention includes an aperture or cut-out portion 38 which serves to define a right or first rail 40, and a left or second rail 44 in the frame 22, each rail 40, 44 having a first end and second end, respectively. Whereas the mounting bracket of the '137 patent is made by punching, stamping or otherwise removing material from the center of the work piece and that would correspond to the aperture or cut-out portion 38, the present invention is manufactured from component parts, and then assembled or joined to form a frame which has an aperture or cut-out portion 38. Thus, in manufacturing of the bracket of FIGS. 1–3D, herein, substantial cost and material savings are achieved.

Figure 2:
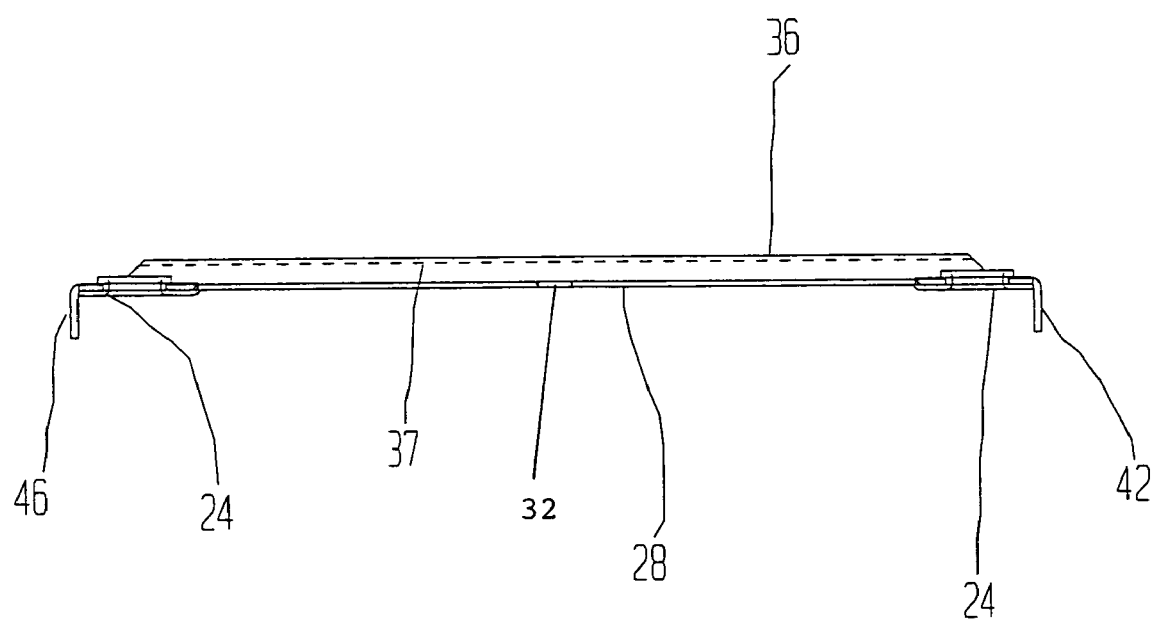
FIG. 2 is a top view of the FIG. 1 embodiment.

To enhance a structural rigidity of the frame 22, the outer or right-most edge of the rail 40 is preferably bent backward at a substantially right angle, to form a lip 42, shown in dashed lines FIG. 1 and in solid lines in FIG. 2. Similarly, the outer or right-most edge of the rail 44 is also preferably bent backward with respect to the front face to form a lip 46, as shown in dashed lines on FIG. 1 and in FIG. 2 in solid lines. The present invention may also use a plurality of beveled corners, four of which are shown at 48, rather than sharp corners for the same reason as described in the '137 patent, and as shown in FIG. 1.

Also, a plurality of pairs of precisely located screw holes 23, 25; 27, 29; 31, 33; 35, 37; 39, 41; 43, 45; 47, 49; and 51,

53 are positioned in the rails 40, 44 to accommodate use with the conventional "large" boxes and/or "large" box covers. The number and placement of these pairs of screw holes may be chosen by the designer for achieving end use purposes.

With reference to FIG. 2, the second end plate or crosstie 28 is shown, and elevated surface 36 is shown in relation to the lips 42 and 46. The thickness of the material is shown with reference to dashed line 37.

With reference to FIGS. 3A–D, the rail 40 and rail 44 components of the mounting bracket are illustrated. FIG. 3A illustrates the rail 40 of the frame 22. The rail 40 is made, preferably, of 20 gauge galvanized sheet metal, that has been stamped, cut or otherwise formed from stock. The rail 40 and the rail 44 are preferably formed in a length to accommodate either of the 16 or 24 inch distance typically separating wall studs. Also, if desired, they may be made of other lengths to accommodate other distances between wall studs for custom designs, or in situations where, for any reason the distance between the adjacent studs is not typical. FIGS. 3B and 3D show a side view of the top and bottom rails 40 and 44, and illustrate the lips 42 and 46 as described above. They may also be made of lengths to be used between floor joists or ceiling joists for floor or ceiling mounted boxes.

The rails 40, 44 are made with conventional metal forming techniques. With reference to FIGS. 1 and 2, the end plates or crossties 26, 28 are also fabricated, preferably from conventional 20 gauge galvanized sheet metal, using conventional metal forming techniques. As shown in FIG. 1, at each of the four corners, a conventional fastener 50 joins component parts. The conventional fastener or method of joining used at this location, or at any other location at which sections of the bracket are fastened or joined may include mechanical techniques and welding techniques. Useful mechanical fasteners include those known as bonded, crimped, fold-tab, rivet, self-riveting, screw, bolt, staking and toggle-lock. Useful welding techniques include those known as projection, spot, tig, mig, stick and gas. These methods may be used to fasten each of the upper and lower rails to each of the left and right end plates or crossties of the frame. The fasteners, or connections 50, also may be of a conventional pressed fit, or snap type fitting, as shown in FIG. 2, for example, and described in more detail below.

By manufacturing the mounting bracket in components or pieces, and then joining or-assembling them with conventional techniques, savings in material and cost of manufacture can be achieved due to not having to cut out the material that forms the open space 38, and discard it, or recycle it, with attendant costs.

As also indicated in FIG. 1, the top and the lower rails may be marked with length or distance markers, such as in inches, centimeters, or with any other convenient or useful notation to facilitate the placement of the electrical boxes at precise locations.

Oliva Type Modified Adjustable Mounting Bracket

Referring now to FIGS. 4–22, a second embodiment of the present invention will be described and referred to on the Oliva type assembly adjustable mounting bracket. In general, the second embodiment of the present invention is directed to a bracket for mounting electrical boxes that is made not only of component parts, to save in cost of manufacture, but is also to be adjustable in length. By incorporating the features of this embodiment, a single mounting bracket may be adjusted to be used with structural members, such as wall studs that are typically separated by a distance of either 16 or 24 inches, or, by other, unconventional distances between studs.

Figure 4:
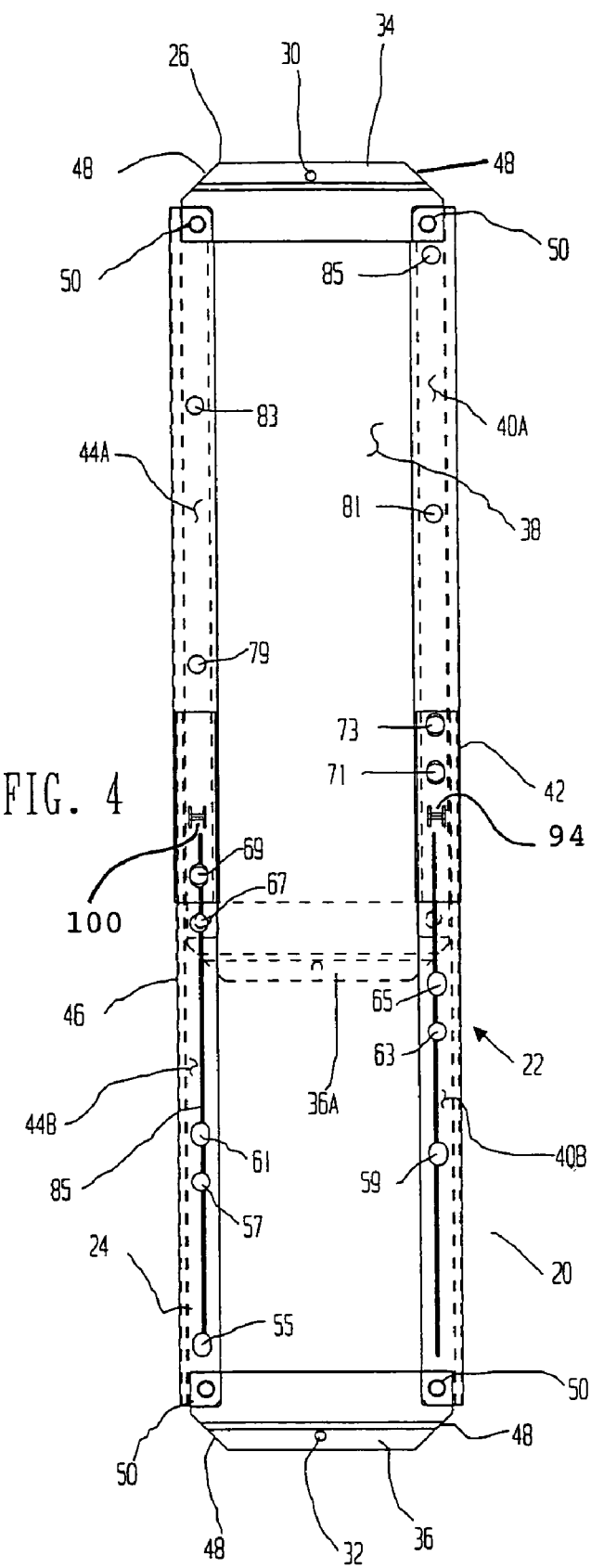
FIG. 4 is a front view of a second embodiment of the present invention.
Figures 15, 16:
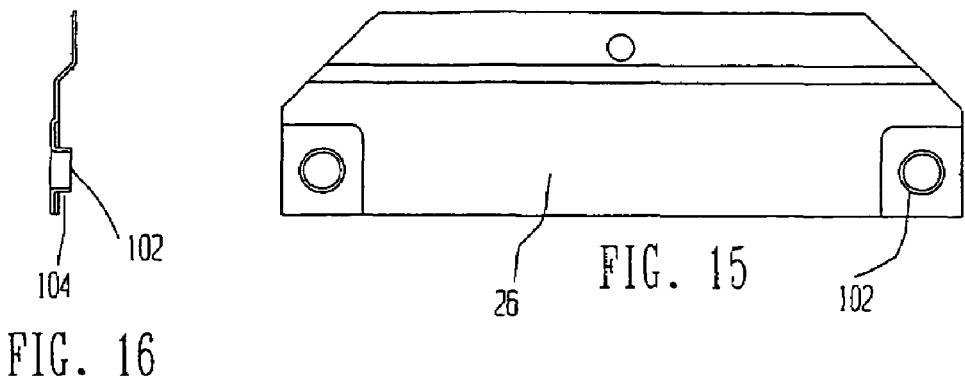
FIG. 15 is a front view of the left end plate or crosstie of the second embodiment.
FIG. 16 is a top view of the FIG. 15 end plate or crosstie.
Figure 17:
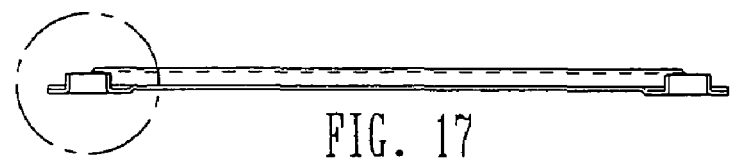
FIG. 17 is a side view of the FIG. 15 end plate or crosstie.
Figure 18:
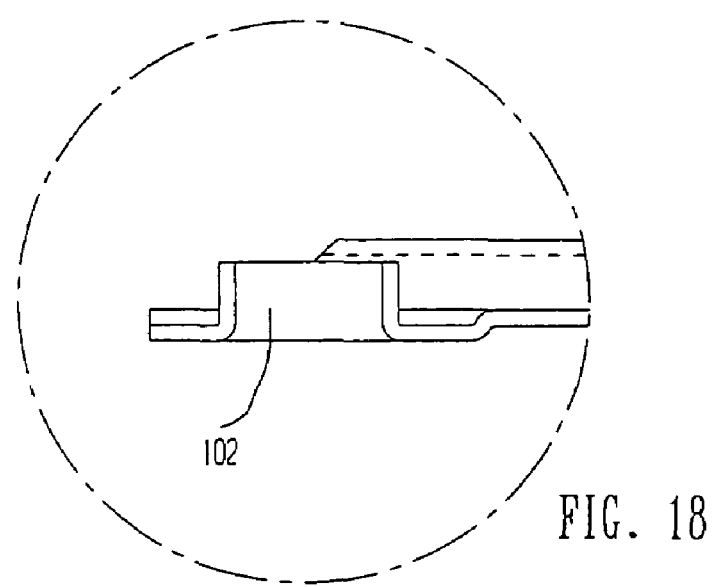
FIG. 18 is an enlarged detail as indicated in FIG. 17.
Figure 19:
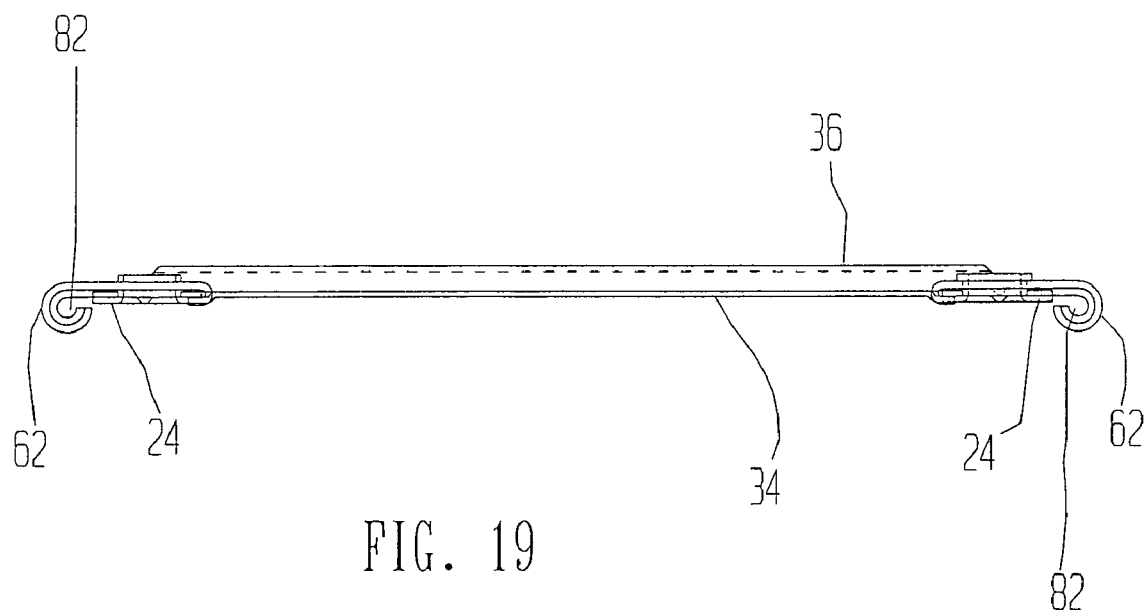
FIG. 19 is a side view of the second embodiment bracket.

With reference to FIG. 4, like numbers describe like parts as shown in the FIGS. 1–3 embodiment. However, as will be described in greater detail, the rail 40 and rail 44 of the bracket frame 22 are each made in separate pieces 40A, 40B and 44A, 44B, and constructed so as to have a sliding or telescoping relationship. As shown, for example, in FIG. 4, the top pair of rails 40A, 44A is fashioned to slide over the bottom pair rails 40B, 44B so that varying distances between structural members, such as wall studs, may be accommodated. Each of rails 40A, 44A, 40B, 44B having first and second ends, respectively. In the FIG. 4 embodiment, the bottom end plate or crosstie 36, shown in solid lines, is intended to represent a bracket used for wall studs that are separated by a distance of 24 inches. The bottom end plate or crosstie 36A, shown in dashed lines in FIG. 4, is intended to represent the bracket adjusted so as to accommodate wall studs that are separated by a distance of 16 inches. In the 16-inch configuration a major portion of the bottom pair of rails have been inserted into and covered by the top pair of rails 40A, 44A.

Also, optionally, and as shown, the rails have a plurality of pairs of screw holes placed at predetermined distances for precise placement of the conventional "large" boxes and/or "large" box covers. The holes 55, 57, 59, 61, 63, 65, 67, 69, 71, 73, 79, 81, 83 and 85 shown in FIG. 4 are placed so that when the bracket is extended, it will hold four boxes with each box retained by a pair of screws positioned through pairs of holes, for example, 83, 85; 79, 81; 67, 71; and 57, 63. When the bracket is retracted, it will hold three boxes, with two screws for each box located at holes 83, 85; 79, 81; and 69, 73 for example.

With reference to FIG. 5, rail 40A of the bracket (as shown in FIG. 4) is also referred to as a rail section 40A. Referring to FIG. 6, the rail section 40A is shown, from a top view, with dashed lines indicating the curved, right and left ends 70, 72 of the rail section 40A, as shown in greater detail in FIG. 7. Referring to FIG. 6, the right surface of the rail 40A is, preferably, of a rounded, bent configuration 62 as also shown in FIG. 7. The right of the rail section 40A, bent in a rounded fashion as shown at 62, forms a hook, or channel 64 that terminates in end 70, as illustrated in FIG. 7. The left of the rail section 40A is also bent or folded, using conventional metal forming techniques, and shown as a channel at 66 in FIG. 7, with the bent edge terminating at end 72, shown in both FIG. 6 and 7. The radius of curvature of the right fold or bend at 62 is preferably greater than the radius of curvature of the bend or fold at the left of section 40A, as shown at 68 in FIG. 7. The relatively smaller radius of curvature bend at the bottom 68 is shown as an enlarged detail in FIG. 8, with the inner, or bottom right rail section 40B (as shown in FIG. 10) trapped by the curved bottom 68.

Referring to FIGS. 10–13, the bottom, right rail section 40B and its various features will be described. The rail section 40B is also manufactured of the same materials and of the same techniques as the rail section 40A; however, rail section 40B is sized and configured so as to be in sliding relationship with the rail section 40A and to slide within the periphery of channels 64 and 66 of rail section 40A, as illustrated in FIG. 7. Shown in FIG. 11 is a side view of the rail section 40B, with a curved or folded over portion having a radius of curvature small enough such that the rail section 40B slides within the channel 64 of rail section 40A. The left side of rail section 40B (as shown in FIG. 10) may be left without a curvature, or may be formed with a curved radius, such that the radius is small enough to permit the rail section 40B to slide within the radius of curvature of the portion of rail section 40A, i.e., within channel 66 and shown in FIGS.

7 and 8. FIG. 11 illustrates, in dashed lines, the end 84 and end 86, corresponding to the ends 70 and 72 of FIG. 7, with, of course, the radius of curvature of the bend or folded edges of rail section 40B, if any, being small enough to fit within the channels defined by the radius of curvature of each edge in rail section 40A.

As shown in FIGS. 10, 13 and 14, a stiffening rib or groove 87 is formed in rail section 40B by conventional means and for a predetermined distance. This groove extends along the length of the rail section 80, and terminates at locations 88, 89. Groove end 88 is separated by a predetermined distance from a "U" shaped cutout 90. The rib, groove, or "stiffening bead" 87 is formed from the body by conventional techniques. The bead 87 functions to stiffen the rail and to provide a raised surface to support the electrical box. Without the rib 87, one end of the electrical box would rest on a different level than the other end of the box, and thus not be level during use.

The Oliva type assembly adjustable mounting bracket, preferably, includes stops whereby, the bracket will automatically stop at a predetermined distance, such as that necessary to accommodate studs placed 24 inches apart. While numerous different conventional stops may be used, all of which are considered to be equivalent, one such type of stop will be described. The cutout 90 is formed of an U-shaped open space 92 which has been cut out, punched out, or otherwise removed from the rail section 40B, and to form a central tongue 94 which remains. The tongue 94 is bent or depressed slightly in a leftward or rearward direction as shown in FIG. 12 so that its end 97 extends beyond the surface of the rail section 40B. With reference to FIG. 10, the end 97 extends upwards from the surface of the page.

With reference to FIG. 5, a corresponding channel 96 is formed in rail section 40A, with an open, cutout region 98 punched or otherwise cut out of the material of rail section 40A, leaving a tongue 100. The U-shaped channel 90 is oriented in an opposite direction from the U-shaped channel 96. Also, the tongue 100 of the U-shaped channel 96 is depressed slightly, from the surface of rail section 40A, as shown in FIG. 9 where the end 103 is depressed so that it extends downward into the page with reference to FIG. 5. The tongue 94 is considered to be the stop mechanism male piece, and the piece 100 is considered to be the stop mechanism female piece. In operation, the adjustable bracket as shown in FIG. 4, with the top pair of rail sections 40A, 44A and the bottom pair of rail sections 40B, 44B being slideable with respect to each other pair, a single bracket can be conveniently used for mounting structural members, such as wall studs that are separated by distances of 16, or 24 inches. In the case where the structural members are wall studs mounted 24 inches apart, the FIG. 4 bracket is pulled apart, until the tongues 94, 94 of the lower pair of rail sections 40B, 44B collide with and are stopped by the lower tongues 100, 100 of the upper pair of rail sections 40A, 44A, as shown in FIG. 4. Also, as with the fixed rail embodiment as described above with respect to FIGS. 10–13, the adjustable rail embodiment may include screw holes placed at predetermined locations to accommodate the large box and/or large box cover, as describe above in greater detail.

As may be readily apparent, the lower left side and lower right side of the mounting bracket are preferably formed with the same materials in the same fashion as are the upper left and upper right brackets, except, of course configured so as to be attached to the end plates or crossties at the lower left and lower right respectively. When all of the components are assembled, an open faced, adjustable bracket made of component parts is produced. This adjustable bracket is advantageous in that it is constructed of component parts, as well as is adjustable in length.

Figure 20:
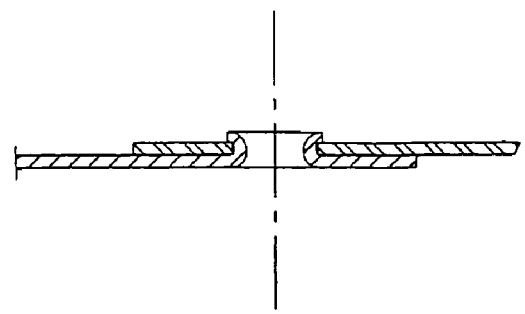
FIG. 20 is a side view of a self-riveting structure of the present invention.
Figure 21:
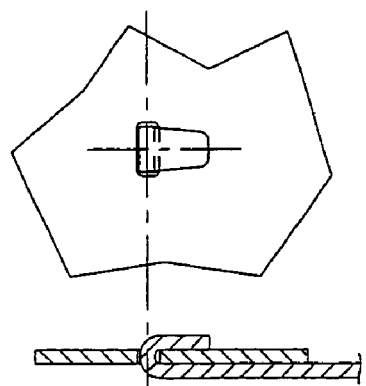
FIG. 21 is a folded tab structure of the present invention.
Figure 22:
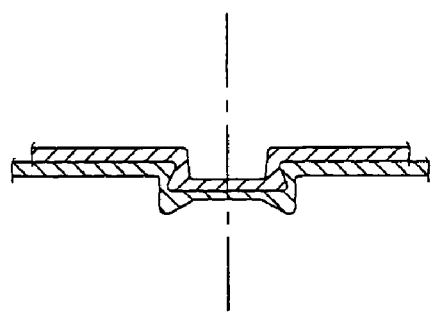
FIG. 22 is a toggle-loc structure of the present invention.

FIGS. 15–18 provide detailed illustrations of self-riveted assembly or toggle lock techniques by which the side edges may be fastened to the end plates of the mounting brackets as described above. Manufacture of this type of connection uses a conventional self-rivet assembly or "toggle loc" brand assembly, as shown in FIGS. 15–18 for each of the two corners of the end plates or crossties and each of the two corners of the rails, respectively. In the conventional process a cylindrical portion 102 of the overlapped end 104 of upper rails is extruded. This extruded material is then folded over itself to create the "self riveting assembly" at all four corners of the bracket. FIG. 20 illustrates a self-riveting structure; FIG. 21 a folded tab structure and FIG. 22 a toggle-loc brand assembly, all of which are made by conventional techniques.

While the FIG. 4 embodiment is shown using four pieces, it is within the scope of the present invention that the bracket could be made of other numbers of components, with each component affixed to the other with conventional techniques as described above. For example, brackets being made of two pieces, three pieces, four, five, six or more, can be made and all are considered to be within the scope of the present invention. Alternatively, the shapes of the various components could be altered as well. Thus, for example, one alternate embodiment could envision stamping the end plates or crossties such that they form U-shapes and these U-shapes in turn could then be fastened to either set of two or four top and bottom rails as described above.

Furthermore, while the preferred method of attaching the components to each other is through the self-riveting technology described above, alternative ways of fastening the components together are considered to be equivalent. While not intended to be exhaustive, but rather illustrative, such processes as the mechanical and welding processes identified above may be used to fasten the components, each to the other and are considered to be within the scope of the present invention.

Modified Caddy-Type Bracket

Referring to FIGS. 23–26D, an improved caddy-type bracket incorporating various improvements of the present invention will be described. The modified caddy-type bracket 200 is shown as having a right side rail 202, a left side rail 204, a top end plate or crosstie 206 and a bottom end plate or crosstie 208. Each of rails 202, 204 and end plates 206, 208 have first and second ends, respectively. The materials of construction, the general methods of construction and the assembling of these four components into a single bracket has been described above with respect to other embodiments. Essentially, rather than making the entire bracket out of a single piece of material, the bracket is made in components, and then those components are fastened together using conventional techniques. While the number of components that may initially be formed, and then connected together can vary within the skill of the art in this field, in FIG. 23 a preferable number of components is four, that is two side rails and two end plates or crossties having been previously formed are then connected together at the four corners, one of which is illustrated at 207, by conventional means, and as described above.

Figure 23:
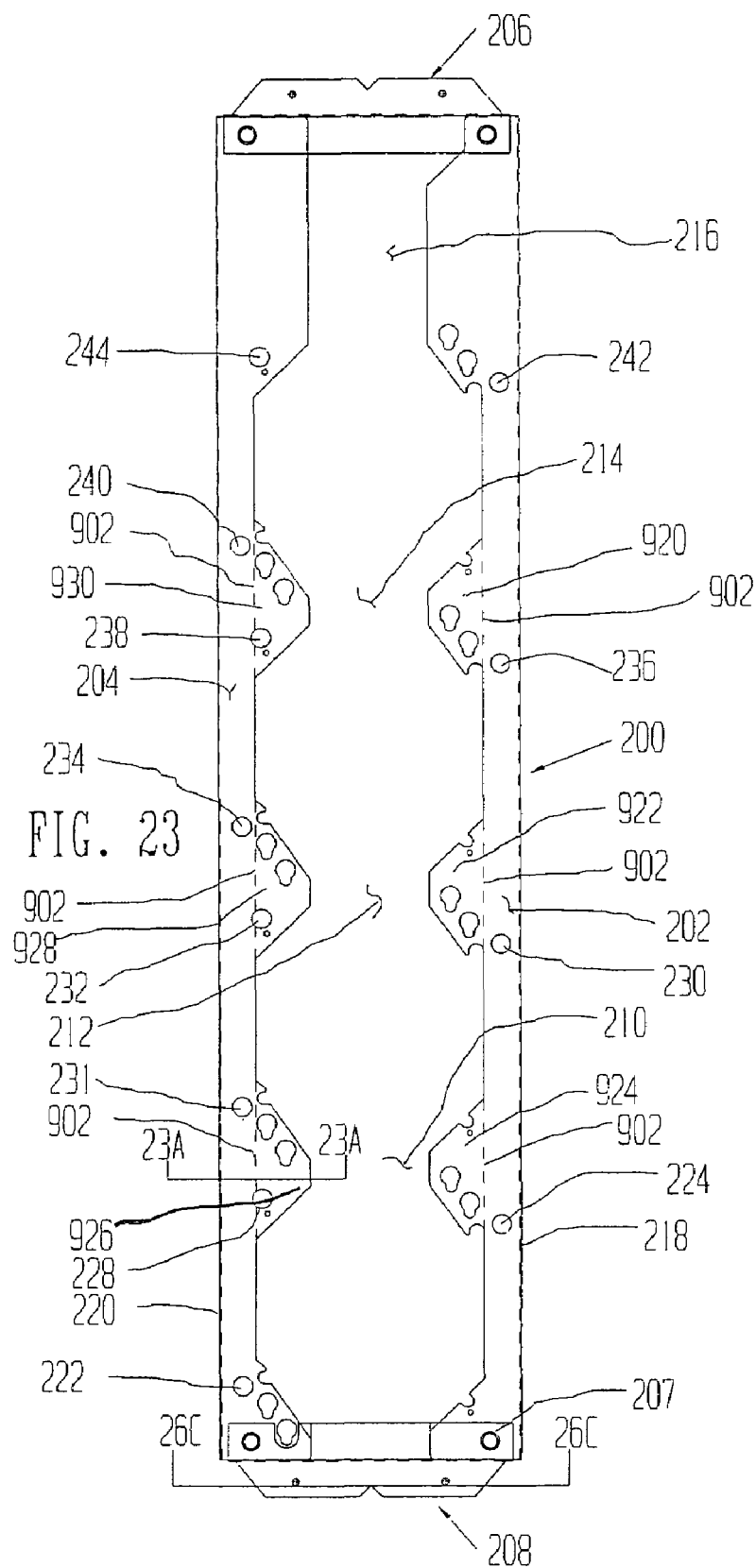
FIG. 23 is a front view of the box type mounting brackets, also known as the "caddy", that has been modified to incorporate principles of the present invention.

As is readily apparent from FIG. 23, one of the advantages of the FIG. 23 embodiment is the absence of any material that connects or extends between the left side and the right side rails, except for at connected end plates. Thus, in the bracket of FIG. 23 an open space is found at 210, 212, 214 and 216. In contrast, in a conventional caddy-type bracket these locations are filled with the bracket material.

Referring to FIG. 23, the outer most ends or edges of the side rails are bent or curved, as shown in dashed lines at 218 for the right side rail 202 and at 220 for the left side rail 204. Another, optional feature for the bracket of FIG. 23 is the placement of various locating holes that are sized and placed to accommodate the "large" box and large cover. Those holes are identified at 222, 224, 228, 230, 231, 232, 234, 236, 238, 240, 242 and 244. Also shown, but not numbered in FIG. 23 are a number of holes and slots for positioning screws and adjusting the position of screws, as is conventional with this type of bracket.

Figure 23A:
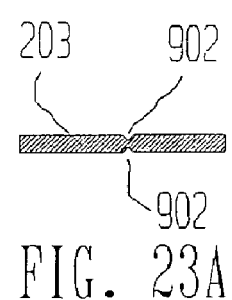
FIG. 23A is a partial cross-sectional view of a bracket side rail of any of the FIG. 23, 24–54 embodiments of the present invention.

Yet an additional optional feature of the bracket of FIGS. 23, 23A, 25A, 25C, 27, 28, 29A, 34, 35A, 36A, 37, 45, 46, 50 and 51 are grooves or scoring lines 902 formed in the front surface and/or back surface—preferably formed in both the front and back surfaces—of the bracket side rails. The grooves or scoring lines 902 depicted in FIG. 23 by dotted lines facilitate removal of flat mounting tabs 920, 922, 924, 926, 928 and/or 930 to accommodate the need for a larger open space between the bracket side rails for a particular application or installation. This optional feature is common to all embodiments of the present invention depicted in FIGS. 23–54, as shown in FIGS. 23, 23A, 25A, 25C, 27, 28, 29A, 34, 35A, 36A, 37, 45, 46, 50 and 51, by the grooves or scored lines 902. To aid clarity and to avoid unnecessarily cluttering the drawings with reference characters, the flat mounting tabs—which in some embodiments of the present invention are removable—are numbered only in FIG. 23. FIG. 23A is a partial cross-sectional view of a bracket side rail of the type shown in FIGS. 23 and 24–54. In FIG. 23A the partial cross-section of a bracket side rail of any of the FIG. 23, 24–54 embodiments of the present invention is shown by the general reference character 203, and the grooves or scored lines 902 are shown formed in both the front and back surfaces of the side rail. One of ordinary skill in the art will understand that grooves or scored lines 902 may be formed by a variety of conventional means and that the grooves may be continuous or interrupted and of constant or varying depth, width and cross-sectional shape. It will also be understood by a person of such ordinary skill in the art that removal of the mounting tabs may be facilitated by one or more perforations penetrating between the front and back surfaces of the side rail mounting tabs. All such embodiments having grooves or perforations to facilitate removal of the mounting tabs are considered to be within the scope of the present invention.

Figure 24:
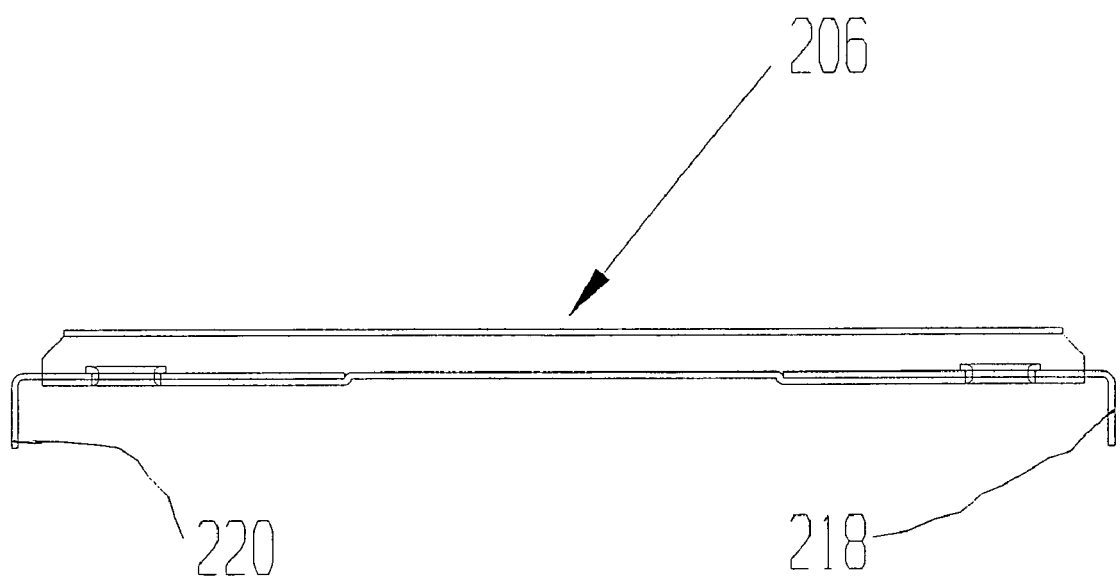
FIG. 24 is an end view of the FIG. 23 bracket.

FIG. 24 is an end view of the FIG. 23 bracket, showing the end plate 206 and the extended wings or legs 218 and 220 as described above. FIG. 25C shows as an individual component, the left side rail 204, together with the various positioning holes feature of the present invention, as numbered, and the various, conventional screw positioning holes not numbered. FIG. 25D is an end view of the FIG. 25C side rail, illustrating the leg 220. FIG. 25A shows the right side rail of the FIG. 23 bracket, together with the screw positioning holes of the present invention as numbered and the conventional screw positioning holes and adjustment sleeve not numbered. FIG. 25B is an end view of the FIG. 25A side rail, illustrating the leg 218. FIG. 26B is a front view of the end plate 208, illustrating the location of the conventional connection at 207. FIG. 26C is a cross sectional view of the FIG. 26B end plate, drawn through line 26C—26C. FIG. 26D is a side view of a corner connection 207 and FIG. 26A is an enlargement of the corner connection 207.

Combined Oliva-Type/Caddy-Type Adjustable Bracket

Figure 27:
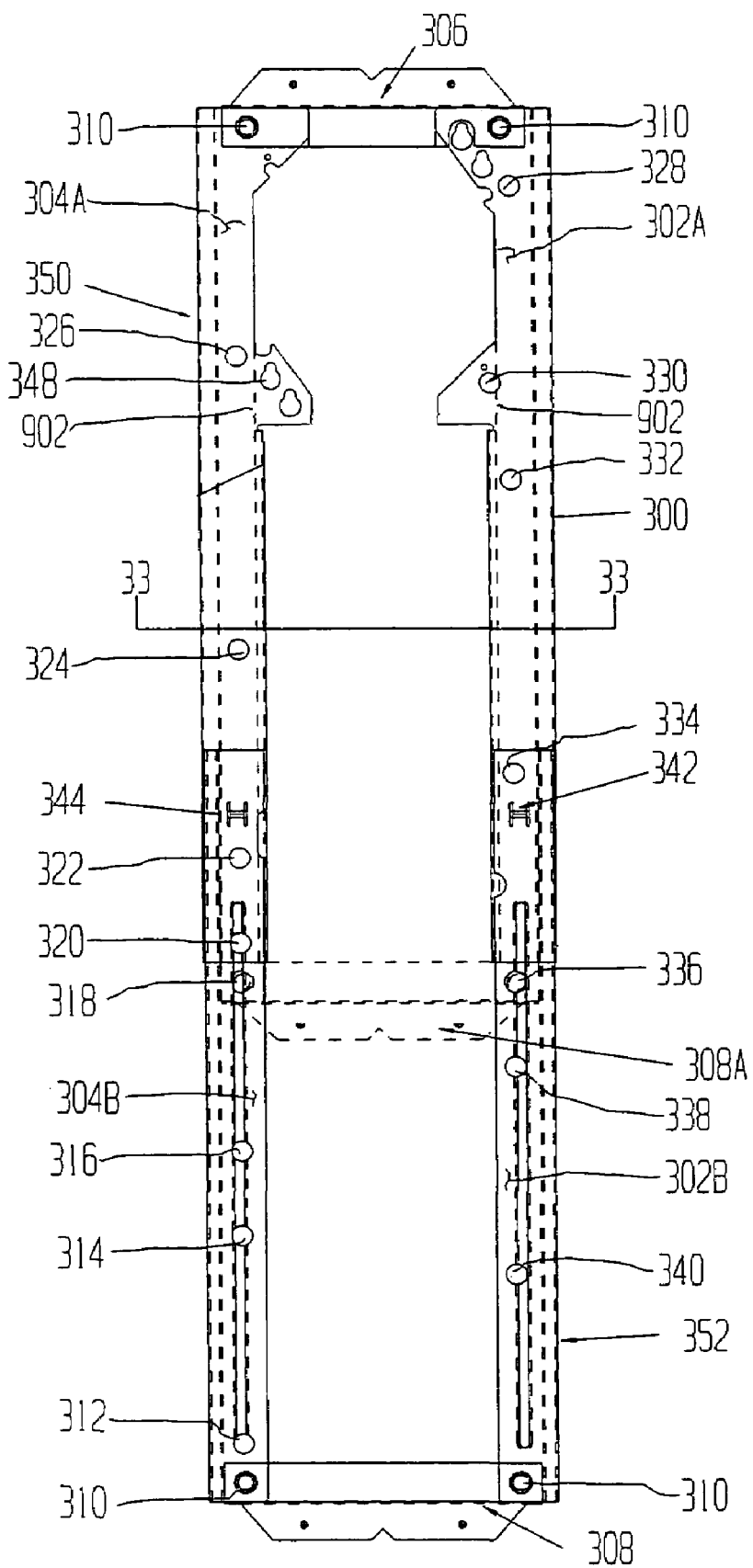
FIG. 27 is a front view of a combined Oliva type, caddy-type bracket incorporating various features of the present invention.

Referring to FIGS. 27–33 an adjustable, Oliva-type/caddy-type mounting bracket 300 will be described. Referring to FIG. 27, bracket 300 incorporates features of the Oliva-type bracket, the caddy-type bracket, the component construction features of the present invention, the adjustability feature of the present invention, the placement of locating holes for the "large" box and box covers and, a gravity assist feature for the locating hole and adjustment slots of the caddy-type bracket. The bracket 300 includes an upper right side rail 302A, a bottom right side rail 302B, an upper left side rail 304A and a lower left side rail 304B. The left and right side rails are joined or connected at the four corners of the bracket to an upper end plate 306 and a lower end plate 308. Each of rails 302A, 302B, 304A, 304B and end plates 306, 308 have first and second ends, respectively. The bracket of FIG. 27 is preferably made in six components, with the top side rails and the bottom side rails sized and configured to be in sliding relationship each to the other and the side rails connected to the end plates or crossties at the corners of the bracket, as shown in the four corners each of which has been labeled with reference numeral 310. Preferably this connection at 310 is conventional, as described above. The bracket 300 also includes locating holes at 312, 314, 316, 318, 320, 324, 326, 328, 330, 332, 334, 336, 338, and 340 for accommodating the "large" box and box cover, as described above. The bracket 300 also incorporates the curved outer edges of the upper and lower rails, as described above, so that the upper rails 302A and 304A have a sliding relationship with the lower rails 302B and 304B. Again referring to FIG. 27, the lower rail is shown in solid lines in an extended position, so as to be accommodated between studs separated by a distance of 24 inches, and with the end plate 308 shown in a compressed or inserted position in dashed lines at 308A. In the compressed or inserted position, the length of the bracket 308 is chosen to be used with studs that are separated by a distance of 16 inches.

The bracket of FIG. 300 also includes the channel and tongue stops or interlocks, as described above, and shown at 342 and 344 in FIG. 27. As is readily apparent from FIG. 27, the bracket 300 incorporates the caddy-type structure in which a series of pre-positioned locating holes and adjustment slots are shown in the upper region of the bracket. In this regard one of the locating hole and adjustment slots is labeled with reference numeral 348. In some embodiments of the bracket the center lines of the locating hole and the adjustment slot extend in a horizontal direction along the length of the bracket as measured from end plate to end plate. A feature of other preferred embodiments of the present invention, however, is the positioning of the center line between the center of the locating hole and center of the adjustment slot so that it is oriented in a vertical direction across the bracket or along the width of the bracket as measured from side rail to side rail. Such vertical positioning provides for a gravity assist feature for the locating hole and adjustment slot. This essentially represents a rotation of 90° of the adjustment slot from the position of the adjustment slot in the conventional caddy-type bracket. Shown in FIG. 27 are three such locating hole and adjustment slots in the upper part of the bracket, with the adjustment slot positioned in the horizontal orientation.

As also readily apparent in FIG. 27, the caddy-type bracket, having the caddy-type support structures and locating holes is shown in the top position, so that it is located at one end of the bracket as installed between two studs. The remaining part of the bracket is of a modified, Oliva-type structure wherein the side rails do not include the pre-positioned holes and supporting structure, as in the caddy-type bracket. Also, in the bracket 300 of FIG. 27, the slidable side rail feature is incorporated. The bracket 300 also includes the stiffening rib, the "large" box and box cover positioning hole feature and other features as described above. Referring to FIG. 28, the top left side rail 304A is shown, with its "large" positioning holes 322, 324 and 326 shown as well as the channel and tongue stop feature 354. The caddy-type structure screw locating hole and adjustment slot, is shown at 348, in the horizontal orientation. An optional feature (not shown) for the screw locating hole and adjustment slot is positioning the center line of the locating hole and adjustment slot in a vertical orientation or across the bracket and along its width from side rail to side rail. FIG. 29A is a front view of the top right rail 302A of the bracket 300. This top right rail includes the "large" box and box cover positioning holes 328, 330, 332 and 334, together with a channel and tongue stop feature 356. The locating screw and adjustment slots are shown at 348. FIG. 29B is a side view of the FIG. 29A rail and it includes the bent edges in dashed lines, not numbered, and the tongue and channel 356 encircled as a detail. FIG. 29C is a side view of the FIG. 29A rail, and shows an outer curved end 358 and an inner curved edge 360 for accommodating the lower side rail 302B in a sliding relationship, as discussed above. The curved edges, shown as 346 in FIG. 29C, each have a different radius of curvature, with the outer edge having a larger radius of curvature, as shown at 358. FIG. 29D is an enlarged detail of the FIG. 29C end view showing the inner edge with its bent end having a relatively smaller radius of curvature at 360 and the outer edge having a relatively larger radius of curvature at 358. FIG. 29E is a detail of the locating hole and adjustment slot 348, in the horizontal orientation as described above. FIG. 29G is a detail of the locating hole and adjustment slot 348, in the vertical orientation as described above. FIG. 29F shows, in dashed lines, the tongue part of the tongue and channel stop feature 356, as described above. FIG. 30A is a front view of the lower right rail 302B including the "large" box and box cover positioning holes 334, 336, 338 and 340, together with the channel and tongue stop feature 372 and the stiffener rib 376. One of the corner connection holes is shown at 310. FIG. 30B is an end view of the FIG. 30A rail showing both the stiffener rib 370 and a curved outer edge 368. The view 366 of the lower rail 302B emphasizes that the inner edge of the lower rail 302B need not be curved, and that, although not shown to scale, the radius of curvature of outer edge curve 368 of the lower right rail 302B is smaller than and sized to fit in sliding relationship within the outer curvature of the upper rail 302A, as shown at 358 in, for example, FIG. 29D.

Referring to FIG. 30A, the lower right rail component 302B is shown with its positioning holes 334, 336, 338 and 340 illustrated. The U-shaped channel and tongue structure is shown at 372, stiffening rib illustrated at 376 and the hole at the end connection is shown at 310. FIG. 30B is an end view of the FIG. 30A rail component and illustrates the rounded or hooked end 368 and the flat surface of the rail 366 interrupted by the stiffening rib or indentation shown at 370 in FIG. 30B. With reference to FIG. 31A—31D, the lower left rail component 304B is shown. The rail component 304B includes its channel and tongue structure at 374, positioning holes at 312, 314, 316, 318 and 320. FIG. 31B illustrates the side view of the rail generally at 360, with its rounded or curved or hooked end 364 and a channel or indentation or stiffening rib shown at 362. FIG. 31C is an enlarged view of FIG. 31B detailed. FIG. 31D is a side view of the FIG. 31A rail and it includes the bent edges in dashed lines, not numbered, and the tongue and channel 374 encircled as a detail.

Figure 32B:
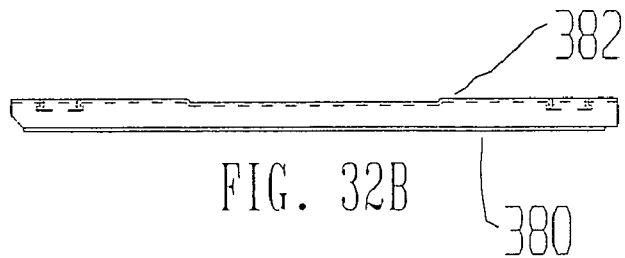
FIG. 32B is a cross-sectional view of the FIG. 32A end plate or crosstie taken through line 32B—32B.
Figure 32A:
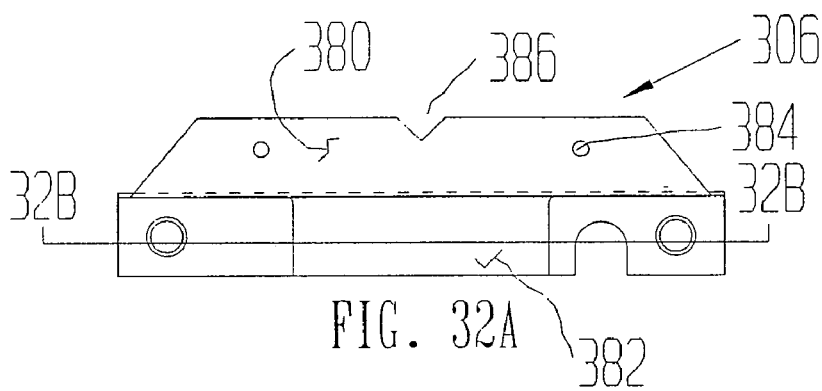
FIG. 32A is a front view of the top end plate or crosstie of the bracket as illustrated in FIG. 27.
Figure 32C:
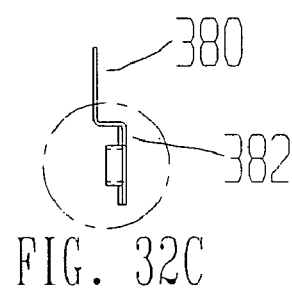
FIG. 32C is a side view of the corner connection of the top end plate or crosstie to the top right rail of the FIG. 27 bracket.
Figure 32D:
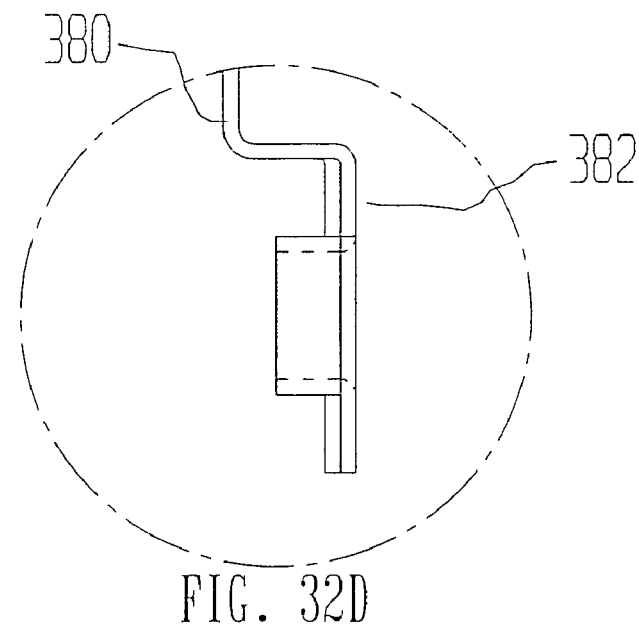
FIG. 32D is an enlarged view of the FIG. 32C connection.
Figure 33:
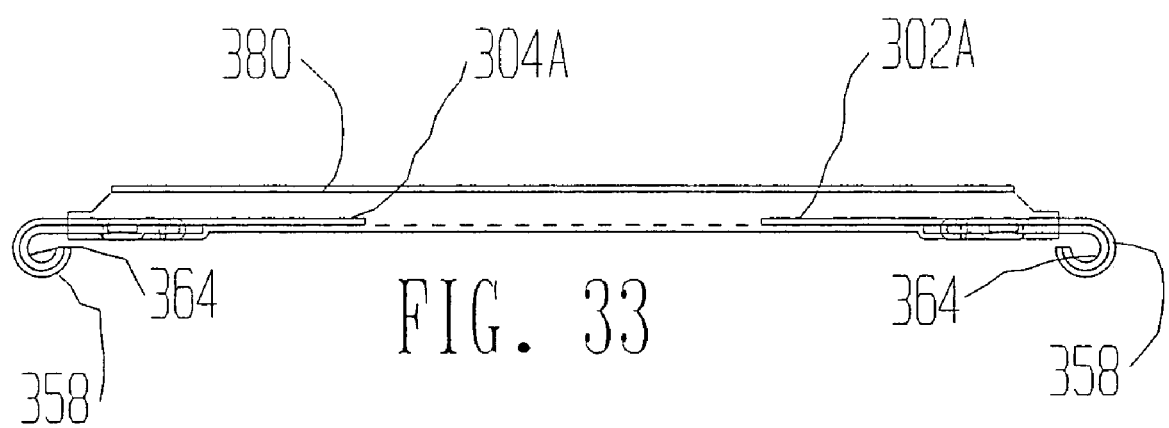
FIG. 33 is a cross-sectional view of the FIG. 27 bracket taken through line 33—33 of FIG. 27.
Figure 34:
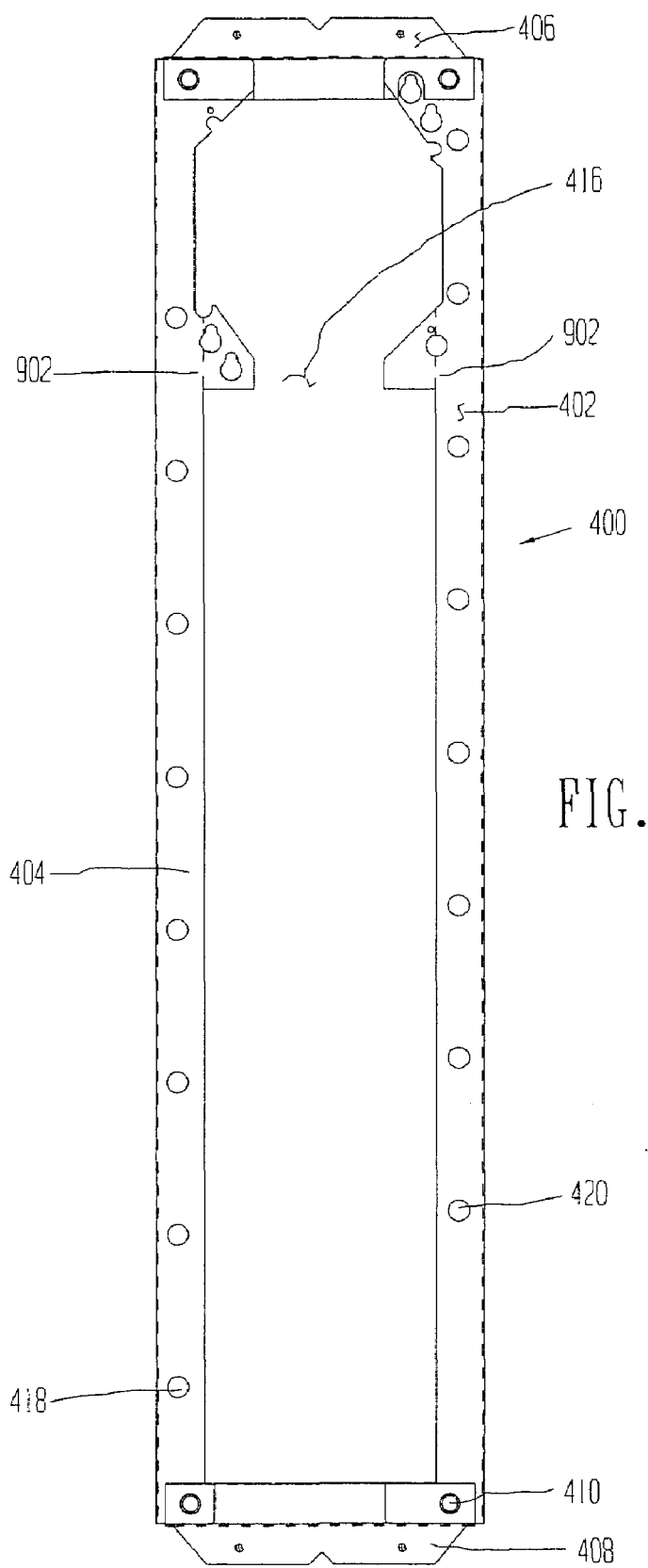
FIG. 34 is a front view of a combined Oliva type and caddy-type bracket incorporating various features of the present invention.
Figure 35A:
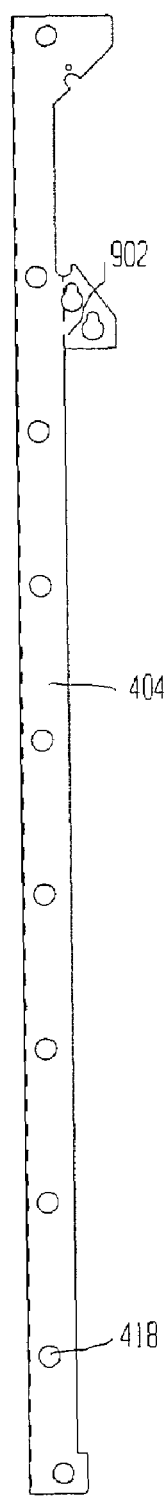
FIG. 35A is a front view of the left side rail of the bracket as shown in FIG. 34.
Figure 35B:
FIG. 35B is an end view of the FIG. 35A side rail.
Figure 36A:
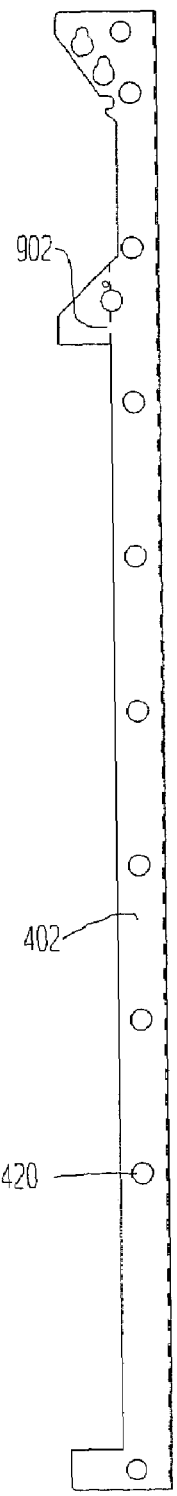
FIG. 36A is a front view of the right side rail of the bracket shown in FIG. 34.
Figure 36B:
FIG. 36B is an end view of the FIG. 36A side rail.
Figure 36C:
FIG. 36C is a side view of the FIG. 36A side rail.

FIGS. 32A—32D show details of the bracket 300. FIG. 32A shows the main body portion 382, a raised end 380, the V-slot 386, and the screw or nail positioning holes, one of which is identified with reference 384 of end plate 306. FIG. 32B is a side view of the FIG. 32A end plate 306. FIG. 32C is a detail of the corner connection, as described in regard to previous embodiments. FIG. 32D is an enlargement of the FIG. 32C detail. FIG. 33 is a cross-sectional view of the bracket 300, taken through line 33—33 of FIG. 27. In FIG. 33, the upper right rail 302A is shown, with its larger radius outside edge 358 surrounding the smaller radius curved end edge 364 of the lower right rail 302B. Similarly, the upper rail 304A is shown with its larger radius end edge 358 surrounding the smaller radius and edge 364 of the lower rail 304B.

Modified Oliva-Caddy Combination Bracket

With reference to FIGS. 34 through 38, a fixed position, component type bracket having features of the Oliva type mounting as well as of the caddy type structures will be described. The bracket 400 includes a right rail 402, a left rail 404, a top end plate 406 and a bottom end plate 408. Each of rails 402, 404, and end plates 406, 408 have first and second ends, respectively. These rails and end plates are constructed of the same materials and of the shapes as described above with respect to other embodiments. Each rail 402, 404 has its outer edge bent and rounded, as shown in dashed lines, unnumbered, in FIG. 34. The FIG. 400 embodiment also includes provision for one box mounting type structure, near the top end plate 406. However, rather than having a column or brace joining the side rail 402 to the side rail 404, the bracket 400 has an open space, illustrated at 416, as an advantageous feature of the present bracket, and is described above. The box mounting type structure at the end plate 406 of the bracket 400 includes a conventional mounting holes and adjustment slots. The lower part of the bracket 400 is the Oliva type, as described about with respect to other embodiments. The rails 402 and 404 also include precision mounting holes for mounting the "large" box and/or box cover. Two of these holes are illustrated at 418, 420. The four corners of the bracket are joined in conventional fashion, and is described in detail above. One such corner connection is identified with reference 410. The bracket of the type illustrated in FIG. 34 can be made to fit between studs having various distances between them, such as 16 inches or 24 inches. Also although the bracket 400 is shown with a single box mounting type structure at the top end, various combinations of Oliva type mounting structure in box mounting type structures could be made. All such combinations, having at least one Oliva type mounting structure and at least one box type mounting structure are considered to be within the scope of the present invention, as are embodiments having locating hole and adjustment slot 348 in either a horizontal or vertical orientation as described above. FIG. 35A illustrates left bracket 404 with precision mounting hole 418. FIG. 35B is an end view of the FIG. 35A rail, and illustrates the edge lip 424. FIG. 36A shows the right side rail 402, together with its mount precision mounting holes, one of which is identified with reference 420. FIG. 36B is an end view of the FIG. 36A rail, and shows the edge lip 422, shown in dashed lines but not numbered in FIG. 36A. FIG. 36C is a side view of the rail 402.

Adjustable Caddy-Type Bracket

With reference to FIGS. 37–54, an adjustable caddy-type bracket will be described. Shown in FIG. 37 is a front view of bracket 500. The bracket 500 is structured and adapted to provide four precise locations for a four-box mounting type bracket. However, the bracket 500 is made of component parts, in accordance with the principles of the present invention, and is also made such that pairs of its side rail components are slidable with respect to each other. The bracket 500 includes a lower end plate 502, and an upper end plate 504, both types of which are as described above with respect to other embodiments. The bracket 500 also includes six component side rails, including a lower right rail 506, lower left rail 508, midsection right side rail 510, midsection left side rail 512, top right side rail 514 and left side top rail 516. Each of rails 506, 508, 510, 512, 514, 516 and end plates or crossties 502, 504 have first and second ends, respectively. These rails are made with curved outer edges, as described above, so that they provide a telescoping relationship that permits the top, bottom and midsections to be slidable with respect to each other. Also, as is readily apparent, the bracket 500 includes open spaces, shown at 522, 520 and 518 between the left side and right side rails. Four corners of the bracket 500 are joined together in a conventional fashion as described above. The side rails components also are provided with conventional positioning holes and adjustment slots, unnumbered except for a positioning hole 524 and 526, for accommodating the "large" box and/or box cover. The bracket 500 may also employ the gravity assist positioning hole and adjustment slot, in which the slot is located below the screw positioning hole, so that a gravity assist is provided, as described above.

FIG. 38 is an end view of the FIG. 37 bracket 500, showing the outer edge curls at 528. FIG. 39 is a side view of the bracket 500, with the bottom end plate 502 projection shown at 532 and the top end plate 504 projection shown at 534.

Figure 40:
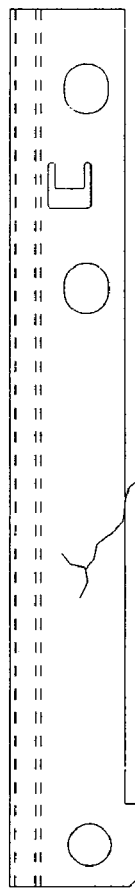
FIG. 40 is a front view of the lower left side rail of the bracket shown in FIG. 37.
Figure 41:
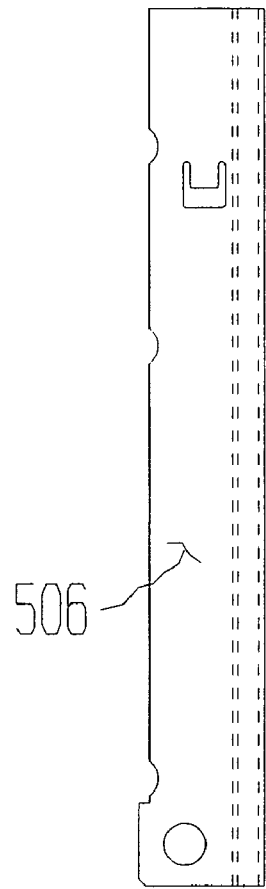
FIG. 41 is a front view of the lower right side rail of the bracket shown in FIG. 37.
Figure 43:
FIG. 43 is a side view of the FIG. 41 side rail.
Figure 44:
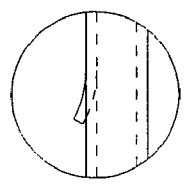
FIG. 44 is an enlarged view of the detail shown in FIG. 43.
Figure 42:
FIG. 42 is an end view of the FIG. 41 side rail.

FIG. 40 is a front view of the lower left rail 508, and FIG. 41 is a front view of the lower right rail 506. FIG. 42 is an end view of the FIG. 41 rail 506, and FIG. 42 is an end view of the FIG. 41 rail section 506. FIG. 43 is a side view of the rail section 506 and FIG. 44 is an enlarged detail showing the channel and tongue stop feature of the invention. FIG. 45 is a front view of the left center rail or midsection rail 512 and FIG. 46 is a front view of the right side center rail or midsection rail 510. FIG. 47 is an end view of the right side center rail 510, illustrating the curved outer edge of the rail having a radius of curvature large enough to provide for a sliding relationship between it and the lower right side rail 506 and the upper right side rail 514. FIG. 48 is an enlarged detail of the channel and tongue stop feature, shown as being incorporated in the bracket 500.

FIG. 50 is a front view of the upper left rail 516 of the bracket 500 and FIG. 51 is a front view of the upper right rail 514 of the bracket 500. FIG. 52 is an end view of the upper right rail 514. FIG. 53 shows an enlarged detail of the tongue and channel stop feature of the invention and FIG. 54 is a side view of the FIG. 51 top right rail 514.

In addition, while one type of sliding configuration is disclosed, other, conventional sliding type constructions may be used with the present invention, and all operable such types of sliding mechanisms are considered to be within the scope of the present invention, as are embodiments having locating hole and adjustment slot 348 in either a horizontal or vertical orientation as described above.

We claim the following:

1. An electrical box mounting bracket comprising:
    a first substantially flat and elongated top rail having at least one longitudinal edge, a first end portion, a second end portion and having a length, width and thickness;
    a second substantially flat and elongated top rail having at least one longitudinal edge, a first end portion, a second end portion and having length, width and thickness dimensions substantially the same as the corresponding dimensions of the first top rail;
    a first substantially flat and elongated midsection rail having at least one longitudinal edge, a length, a first end, and a second end;
    a second substantially flat and elongated midsection rail having at least one longitudinal edge, a length, a first end, and a second end;
    a first substantially flat and elongated bottom rail having at least one longitudinal edge, a first end portion, a second end portion and having a length, width and thickness;
    a second substantially flat and elongated bottom rail having at least one longitudinal edge, a first end portion, a second end portion and having length, width and thickness dimensions substantially the same as the corresponding dimensions of the first bottom rail;
    a first crosstie having a first end portion and a second end portion and having a thickness substantially the same as said top rails and a length less than half the length of the first top rail;
    a second crosstie having a first end portion and a second end portion and having substantially the same dimensions as the first crosstie;
    the first top rail and the first crosstie fixedly joined at their respective first end portions such that their respective length dimensions are oriented substantially perpendicular;
    the second top rail fixedly joined at its first end portion to the second end portion of said first crosstie such that their respective length dimensions are oriented substantially perpendicular and such that the length dimensions of the first top rail and the second top rail extend in the same direction and are parallel, to form a substantially "U" shaped structure;
    the first bottom rail and the second crosstie fixedly joined at their respective first end portions such that their respective length dimensions are oriented substantially perpendicular;
    the second bottom rail fixedly joined at its first end portion to the second end portion of said second crosstie such that their respective length dimensions are oriented substantially perpendicular and such that the length dimensions of the first bottom rail and the second bottom rail extend in the same direction and are parallel, to form a substantially "U" shaped structure;
    a channel formed along said at least one longitudinal edge of the first midsection rail extending from said first end to said second end;
    a channel formed along said at least one longitudinal edge of the second midsection rail extending from said first end to said second end;
    said at least one longitudinal edge of said first top rail slidingly retained within said channel formed in the first midsection rail;
    said at least one longitudinal edge of said second top rail slidingly retained within said channel formed in the second midsection rail;

said at least one longitudinal edge of said first bottom rail slidingly retained within said channel formed in the first midsection rail;

said at least one longitudinal edge of said second bottom rail slidingly retained within said channel formed in the second midsection rail;

said first crosstie, first top rail, first midsection rail, first bottom rail, second crosstie, second bottom rail, second midsection rail, and second top rail defining a substantially rectangular aperture of variable size;

at least one hole formed at a predetermined location in each of said first and second top rails;

at least one hole formed at a predetermined location in each of said first and second midsection rails;

at least one hole formed at a predetermined location in each of said first and second bottom rails;

said at least one hole in said rails defining at least one mounting location for attaching an electrical connection box to the bracket;

said at least one hole in said rails adapted to align with a fastener hole of an electrical connection box placed at said at least one mounting location; and said at least one hole in said rails adapted to accommodate a fastener for attaching an electrical box to said bracket.

2. The electrical box mounting bracket of claim 1 wherein:

said bracket is continuously adjustable in length, to accommodate mounting between studs separated from about 16 inches to about 24 inches.

3. The electrical box mounting bracket of claim 1 further including:

at least one flat tab formed integrally with at least one of said first top rail or said first midsection rail;

said at least one flat tab extending in the width dimension of at least one of said first top rail in a direction from said first top rail toward said second top rail, and extending along a portion of the length of said first top rail, or said at least one flat tab extending in the width dimension of at least one of said first midsection rail in a direction from said first midsection rail toward said second midsection rail, and extending along a portion of the length of said first midsection rail;

at least one hole formed in said at least one flat tab adapted to align with at least one fastener hole of an electrical box;

whereby an electrical box may be attached to the bracket by means of a fastener installed through said at least one hole formed in said at least one flat tab and an aligned electrical box fastener hole.

4. The electrical box mounting bracket of claim 3 further including:

an adjustment slot formed in said at least one hole formed in said at least one flat tab.

5. The electrical box mounting bracket of claim 3 or claim 4 wherein:

a said flat tab is adapted to be separated from a said rail along a score line.

* * * * *